(12) United States Patent
Mikami

(10) Patent No.: US 11,848,149 B2
(45) Date of Patent: Dec. 19, 2023

(54) POWER SUPPLY MEMBER, MAGNETIC SHEET FOR COIL ARRANGEMENT, METHOD OF MANUFACTURING MAGNETIC SHEET FOR COIL ARRANGEMENT

(71) Applicant: FUJIFILM Corporation, Tokyo (JP)

(72) Inventor: Tatsuo Mikami, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 275 days.

(21) Appl. No.: 17/399,604

(22) Filed: Aug. 11, 2021

(65) Prior Publication Data

US 2021/0375538 A1    Dec. 2, 2021

Related U.S. Application Data

(63) Continuation of application No. PCT/JP2019/050954, filed on Dec. 25, 2019.

(30) Foreign Application Priority Data

Feb. 28, 2019   (JP) ................................ 2019-036984

(51) Int. Cl.
*H01F 38/14*    (2006.01)
*H02J 50/12*    (2016.01)
(Continued)

(52) U.S. Cl.
CPC .......... *H01F 38/14* (2013.01); *H01F 27/2866* (2013.01); *H01F 41/0233* (2013.01); *H02J 50/12* (2016.02)

(58) Field of Classification Search
CPC .. H01F 38/14; H01F 27/2866; H01F 41/0233; H02J 50/12
(Continued)

(56) References Cited

U.S. PATENT DOCUMENTS

2007/0241622 A1    10/2007    Toyoda et al.
2009/0002117 A1*    1/2009    Kawarai ............. H01F 17/0006
336/233
(Continued)

FOREIGN PATENT DOCUMENTS

CN    101615490 A    12/2009
CN    103427503 A    12/2013
(Continued)

OTHER PUBLICATIONS

Office Action dated Dec. 13, 2022 from the Japanese Patent Office in JP Application No. 2021-501644 Machine Translation.
(Continued)

*Primary Examiner* — Alfonso Perez Borroto
(74) *Attorney, Agent, or Firm* — Sughrue Mion, PLLC

(57) ABSTRACT

Provided are a power supply member in a wireless power supply system, and applications of the power supply member. The power supply member includes: a first magnetic sheet that includes a first metal magnetic powder and a first resin, the first metal magnetic powder having a ratio of a length of a long side to a length of a short side is more than 1.0; a coil that is wound around and arranged on one surface of the first magnetic sheet; and a second magnetic sheet that is arranged on the same surface of the first magnetic sheet as the surface where the coil is arranged, is arranged on at least one of a side inside of an inner peripheral end of the coil or a side outside of an outer peripheral end of the coil, and includes a second metal magnetic powder and a second resin.

18 Claims, 12 Drawing Sheets

(51) Int. Cl.
*H01F 27/28* (2006.01)
*H01F 41/02* (2006.01)

(58) Field of Classification Search
USPC .......................................................... 307/104
See application file for complete search history.

(56) References Cited

U.S. PATENT DOCUMENTS

| | | | |
|---|---|---|---|
| 2010/0007215 A1* | 1/2010 | Sakuma ................ | H01F 27/366 335/297 |
| 2013/0249662 A1 | 9/2013 | Tonoyama et al. | |
| 2014/0176067 A1 | 6/2014 | Suzuki et al. | |
| 2017/0200540 A1* | 7/2017 | Moriuchi .................. | H01F 1/26 |
| 2018/0218817 A1* | 8/2018 | Kobayashi .......... | H01F 27/2455 |

FOREIGN PATENT DOCUMENTS

| | | |
|---|---|---|
| CN | 103858307 A | 6/2014 |
| JP | H11-054314 A | 2/1999 |
| JP | 2002-298095 A | 10/2002 |
| JP | 2005-080023 A | 3/2005 |
| JP | 2005-269599 A | 9/2005 |
| JP | 2009-009985 A | 1/2009 |
| JP | 2010-041906 A | 2/2010 |
| JP | 2012-222926 A | 11/2012 |
| JP | 2013-201374 A | 10/2013 |
| JP | 2014-135382 A | 7/2014 |
| JP | 2018-032841 A | 3/2018 |
| WO | 2005/060072 A1 | 6/2005 |
| WO | 2010/140367 A1 | 12/2010 |

OTHER PUBLICATIONS

Office Action dated Apr. 20, 2023 in Chinese Application No. 201980093205.X.
Office Action dated Jun. 21, 2022 in Japanese Application No. 2021-501644.
International Search Report dated Feb. 25, 2020 from the International Searching Authority in International Application No. PCT/JP2019/050954.
Written Opinion dated Feb. 25, 2020 from the International Searching Authority in International Application No. PCT/JP2019/050954.
International Preliminary Report on Patentability with the translation of Written Opinion dated Aug. 25, 2021 from the International Bureau in International Application No. PCT/JP2019/050954.
Office Action dated Oct. 10, 2022 in Chinese Application No. 201980093205.X.
Office Action dated Jul. 26, 2023 in Chinese Application No. 201980093205.X.

* cited by examiner

POWER SUPPLY MEMBER, MAGNETIC SHEET FOR COIL ARRANGEMENT, METHOD OF MANUFACTURING MAGNETIC SHEET FOR COIL ARRANGEMENT

CROSS-REFERENCE TO RELATED APPLICATIONS

This application is a continuation application of International Application No. PCT/JP2019/050954, filed Dec. 25, 2019, the disclosure of which is incorporated herein by reference in its entirety. Further, this application claims priority from Japanese Patent Application No. 2019-036984, filed Feb. 28, 2019, the disclosure of which is incorporated herein by reference in its entirety.

BACKGROUND OF THE INVENTION

1. Field of the Invention

The present disclosure relates to a power supply member, a magnetic sheet for coil arrangement, and a method of manufacturing a magnetic sheet for coil arrangement.

2. Description of the Related Art

As a wireless power supply member, a magnetic resonance type power supply member has attracted attention. The magnetic resonance method that is one contactless power transmission method refers to a method of burying a coil and a capacitor in a power supply member and a power reception member and causing a resonator thereof to magnetically resonate to transmit power.

In the wireless power supply member of the magnetic resonance magnetic resonance method, a power transmission distance and a power supply efficiency depends on a Q value (Quality factor: also referred to as "quality factor Q") of the power supply member, and as the Q value increases, the power supply efficiency to the power reception member is improved.

The Q value of the power supply member in the wireless power supply relates to attenuation of a spatial magnetic field generated from a coil, and as the Q value increases, the spatial magnetic field intensity decreases for a long time such that the power supply efficiency using a resonance method increases.

In order to improve the Q value, a high permeability sheet is required as a substrate of the power supply member. Further, regarding a relationship between a coil and the high permeability sheet, a high permeability sheet where a satisfactory magnetic path to realize a high Q value and a power supply member including the high permeability sheet are desired.

As a magnetic core member having a configuration where improvement of communication characteristics of an antenna coil and a sufficient electromagnetic shielding function from a shield plate are satisfied simultaneously, a magnetic core member that is disposed between an antenna substrate where an antenna coil is formed and a conductive shield plate and is formed by filling an insulating material with soft magnetic powder is disclosed, in which the magnetic powder on a first surface side is aligned in a direction perpendicular to a sheet surface, whereas the magnetic powder on a second surface side is aligned parallel to the sheet surface (refer to JP2005-80023A).

In addition, a magnetic core member (JP2005-269599A) in which soft magnetic powder is disposed in a magnetic path by filling a cavity where a flow passage cross-section decreasing portion is provided with a molten composite material, an aspect (refer to JP2002-298095A) where, in a contactless IC card reader/writer where a magnetic body having a flexible sheet shape is laid below an antenna coil for performing data communication with an IC card using an electromagnetic induction method, the flexible magnetic sheet is bent and bonded to a coil side surface, or the like is disclosed.

SUMMARY OF THE INVENTION

In the method described in JP2005-80023A, a magnetic body is disposed on a back surface of a coil for power supply in a direction perpendicular to the coil, and a magnetic path is formed in a direction in which magnetic permeability decreases, and it may be difficult to obtain a desired high Q value. In the method described in JP2005-269599A, a magnetic path is formed between coil outer peripheries, it is difficult to form an efficient magnetic path in a power reception member direction, and it may be difficult to obtain a desired high Q value.

The IC card reader described in JP2002-298095A is easy to manufacture from the viewpoint of bending the flexible magnetic sheet to form protruding portion. However, alignment of the magnetic body in the magnetic sheet is not considered, and there is a problem in that it is difficult to provide a power supply member having a satisfactory Q value that is expected from the alignment of the magnetic body.

An object of one embodiment of the present invention is to provide a power supply member that is applied to a wireless power supply system of a magnetic resonance method, in which a satisfactory Q value is realized and a power supply efficiency is high.

An object of another embodiment of the present invention is to provide a magnetic sheet for coil arrangement that can impart a satisfactory Q value to be used for the power supply member.

An object of still another embodiment of the present invention is to provide a simple method of manufacturing a magnetic sheet for coil arrangement that can impart a satisfactory Q value to be used for the power supply member.

Configurations for achieving the objects include the following aspects.

<1> A power supply member in a wireless power supply system wherein power is transmitted and received between a pair of coils distant from each other, the power supply member comprising:
a first magnetic sheet including a first metal magnetic powder and a first resin, the first metal magnetic powder having a ratio of a length of a long side to a length of a short side of more than 1.0;
a coil that is wound around and arranged on one surface of the first magnetic sheet; and
a second magnetic sheet that is arranged on a same surface of the first magnetic sheet as the surface on which the coil is arranged, is arranged on at least one of a side inside of an inner peripheral end of the coil or a side outside of an outer peripheral end of the coil, and includes a second metal magnetic powder and a second resin, the second metal magnetic powder having a ratio of a length of a long side to a length of a short side is more than 1.0, in which the first metal magnetic powder in the first magnetic sheet is arranged in a direction in which the long side is parallel to a surface of the first magnetic sheet, and the second metal magnetic powder in the second magnetic sheet is arranged in a direction in which the long side is parallel to a normal direction of the first magnetic sheet.

<2> The power supply member according to <1>, in which each of the first metal magnetic powder and the second metal magnetic powder is flat metal magnetic powder.

<3> The power supply member according to <1> or <2>, in which a height of the second magnetic sheet from the surface of the first magnetic sheet is higher than a distance from the surface of the first magnetic sheet on which the coil is arranged to a top of the coil.

<4> The power supply member according to any one of <1> to <3>, in which the second magnetic sheet is a resin sheet that is arranged on the same surface of the first magnetic sheet as the surface on which the coil is arranged and wherein the long side of the second metal magnetic powder is arranged in the direction parallel to the normal direction of the first magnetic sheet.

<5> The power supply member according to any one of <1> to <3>, in which the second magnetic sheet is a resin sheet having a helical structure that is arranged on the same surface of the first magnetic sheet as the surface on which the coil is arranged and includes the second metal magnetic powder arranged in the direction in which the long side is parallel to the normal direction of the first magnetic sheet.

<6> The power supply member according to any one of <1> to <3>, in which the second magnetic sheet is a resin sheet having a folded structure that is arranged on the same surface of the first magnetic sheet as the surface on which the coil is arranged and includes the second metal magnetic powder arranged in a direction in which a long side is parallel to a surface of the resin sheet.

<7> The power supply member according to any one of <1> to <3>, in which the second magnetic sheet is formed of bending portions of a pair of side end portions of the first magnetic sheet facing each other.

<8> The power supply member according to any one of <1> to <3>, in which the second magnetic sheet is a resin sheet that is provided in an outer peripheral portion of a cylindrical substrate or a columnar substrate arranged on the same surface of the first magnetic sheet as the surface on which the coil is arranged and includes the second metal magnetic powder arranged in a direction in which a long side is parallel to a surface of the cylindrical substrate or the columnar substrate.

<9> A magnetic sheet for coil arrangement of a power supply member used in a wireless power supply system wherein power is transmitted and received between a pair of coils distant from each other, the magnetic sheet comprising:

a first magnetic sheet that includes a first metal magnetic powder and a resin, the first metal magnetic powder having a ratio of a length of a long side to a length of a short side is more than 1.0;

a region that is formed on one surface of the first magnetic sheet and wherein a coil for forming a magnetic field is arranged;

a second magnetic sheet that is arranged on at least one of a side inside of an inner peripheral end of the coil or a side outside of an outer peripheral end of the coil in the region of the first magnetic sheet wherein the coil is arranged and includes a second metal magnetic powder and a second resin, the second metal magnetic powder having a ratio of a length of a long side to a length of a short side of more than 1.0, in which the first metal magnetic powder in the first magnetic sheet is arranged in a direction in which the long side is parallel to a surface of the first magnetic sheet, and the metal magnetic powder in the second magnetic sheet is arranged in a direction in which the long side is parallel to a normal direction of the first magnetic sheet.

<10> The magnetic sheet for coil arrangement according to <9>, wherein a magnetic permeability $\mu'$ of the first magnetic sheet in units of H/m and a thickness t of the first magnetic sheet in units of m satisfy a relationship of the following Expression 1, $$\mu' \times t \gtrsim 1.2 \times 10^{-7} \quad \text{(Expression 1)}.$$

<11> A method of manufacturing a magnetic sheet for coil arrangement used for a power supply member in a wireless power supply system where power is transmitted and received between a pair of coils distant from each other, the method comprising:

(A) forming a first magnetic sheet including a first metal magnetic powder arranged in a direction in which a long side is parallel to a surface of the first magnetic sheet, by using a resin composition including a first metal magnetic powder and a resin, the first metal magnetic powder having a ratio of a length of the long side to a length of a short side of more than 1.0; and (B) forming a second magnetic sheet including a second metal magnetic powder arranged in a direction in which the long side is parallel to a normal direction of the first magnetic sheet, by using a resin composition including a second metal magnetic powder and a second resin on at least one of a side inside of an inner peripheral end of a coil around which a conductive wire is wound or a side outside of an outer peripheral end of the coil in a region that is provided in the first magnetic sheet and where the coil is arranged, the second metal magnetic powder having a ratio of a length of the long side to a length of a short side of more than 1.0.

<12> The method of manufacturing a magnetic sheet for coil arrangement according to <11>, wherein (B) includes:

(B1-1) obtaining a magnetic sheet including the second metal magnetic powder arranged in a direction in which a long side is parallel to a surface using the resin composition including the second metal magnetic powder and the second resin, (B1-2) obtaining a cut piece by cutting the magnetic sheet obtained in (B1-1), and (B1-3) forming a second magnetic sheet by arranging the cut piece in a direction in which a long side of the second metal magnetic powder in the cut piece is parallel to the normal direction of the first magnetic sheet and fixing the cut piece to a surface of the first magnetic sheet obtained in (A).

<13> The method of manufacturing a magnetic sheet for coil arrangement according to <11>, in which (B) includes:

(B2-1) obtaining a magnetic sheet including the second metal magnetic powder arranged in a direction in which a long side is parallel to a surface using the resin composition including the second metal magnetic powder and the second resin, (B2-2) obtaining a belt-shaped cut piece by cutting the magnetic sheet obtained in (B2-1) in a direction in which the long side of the second metal magnetic powder in the magnetic sheet is arranged in a direction parallel to the normal direction of the first magnetic sheet, and (B2-3) forming a second magnetic sheet by winding the belt-shaped cut piece obtained in (B2-2) to obtain a resin mass and fixing the resin mass to a surface of the first magnetic sheet obtained in (A).

<14> The method of manufacturing a magnetic sheet for coil arrangement according to <11>, in which (B) includes:

(B3-1) obtaining a magnetic sheet including the second metal magnetic powder arranged in a direction in which a long side is parallel to a surface using the resin composition including the second metal magnetic powder and the second resin, (B3-2) obtaining a belt-shaped cut piece by cutting the magnetic sheet obtained in (B3-1) in a direction in which the long side of the second metal magnetic powder in the magnetic sheet is arranged in a direction parallel to a plane direction of the first magnetic sheet, and (B3-3) forming a second magnetic sheet by folding the belt-shaped cut piece obtained in (B3-2) in a zigzag manner to form a resin mass and fixing the resin mass to a surface of the first magnetic sheet obtained in (A).

<15> The method of manufacturing a magnetic sheet for coil arrangement according to <11>, wherein (B) includes: (B4-1) forming a second magnetic sheet by bending a pair of side end portions facing each other in the first magnetic sheet that is obtained in (A) and includes the first metal magnetic powder arranged in the direction in which the long side is parallel to the surface with respect to a surface of the first magnetic sheet.

<16> The method of manufacturing a magnetic sheet for coil arrangement according to <11>, in which (B) includes:

(B5-1) forming a magnetic layer on an outer peripheral surface of a cylindrical substrate or a columnar substrate by preparing the cylindrical substrate or the columnar substrate and applying the resin composition including the metal magnetic powder and the resin to the outer peripheral surface of the cylindrical substrate or the columnar substrate under a condition that the second metal magnetic powder is arranged in a direction where a long side is parallel to the outer peripheral surface of the cylindrical substrate or the columnar substrate; and (B5-2) forming a second magnetic sheet by fixing the cylindrical substrate or the columnar substrate where the magnetic layer is formed to a surface of the first magnetic sheet obtained in (A).

One embodiment of the present invention can provide a power supply member that is applied to a wireless power supply system of a magnetic resonance method, in which a satisfactory Q value is realized and a power supply efficiency is high.

Another embodiment of the present invention can provide a magnetic sheet for coil arrangement that can impart a satisfactory Q value to be used for the power supply member.

Still another embodiment of the present invention can provide a simple method of manufacturing a magnetic sheet for coil arrangement that can impart a satisfactory Q value to be used for the power supply member.

DESCRIPTION OF THE PREFERRED EMBODIMENTS

Figure 1A:
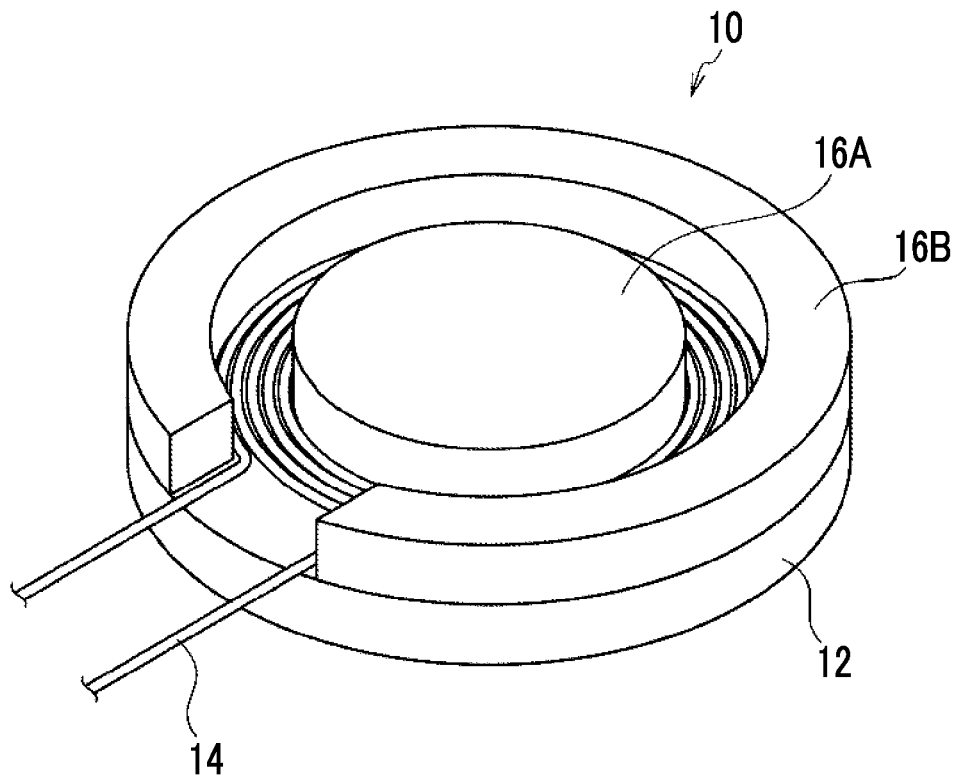
FIG. 1A is a perspective view showing one example of a power supply member including a second magnetic sheet on both a side inside of an inner peripheral end of a region where a coil is arranged and a side outside of an outer peripheral end of the region in one embodiment of a power supply member according to the present disclosure.

Hereinafter, examples of a power supply member, a magnetic sheet for coil arrangement, and a method of manufacturing a magnetic sheet for coil arrangement according to the present disclosure will be described in detail. However, the present disclosure is not limited to the following embodiments in any way, and modifications can be made as appropriate within the desired range of the present disclosure.

In the present disclosure, a numerical range indicated by using "to" means a range including numerical values described before and after "to" as the minimum value and the maximum value, respectively.

Regarding numerical ranges that are described stepwise in the present disclosure, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In the present disclosure, a combination of two or more preferred aspects is a more preferable aspect.

In the present disclosure, in a case where a plurality of substances corresponding to each component are present, the amount of each component means the total amount of the plurality of substances, unless otherwise specified.

In the present disclosure, the term "step" denotes not only an individual step but also a step which is not clearly distinguishable from another step as long as an effect expected from the step can be achieved.

In the present disclosure, "power supply member that is applied to a wireless power supply system of a magnetic resonance method where power is transmitted and received between a pair of coils distant from each other" will also simply be referred to as "wireless power supply member" or "power supply member".

In each of the drawings of the present disclosure, components represented by the same reference numerals are the same components.

Power Supply Member: Power Supply Member Used in Wireless Power Supply System)

The power supply member according to the present disclosure is a power supply member in a wireless power supply system where power is transmitted and received between a pair of coils distant from each other, the power supply member including: a first magnetic sheet that includes metal magnetic powder where a ratio of a length of a long side to a length of a short side is more than 1.0 and a resin; a coil that is wound around and arranged on one surface of the first magnetic sheet; and a second magnetic sheet that is arranged on the same surface of the first magnetic sheet as the surface where the coil is arranged, is arranged on at least one of a side inside of an inner peripheral end of the coil or a side outside of an outer peripheral end of the coil, and includes metal magnetic powder where a ratio of a length of a long side to a length of a short side is more than 1.0 and a resin, in which the metal magnetic powder in the first magnetic sheet is arranged in a direction in which the long side is parallel to a surface of the first magnetic sheet, and the metal magnetic powder in the second magnetic sheet is arranged in a direction in which the long side is parallel to a normal direction of the first magnetic sheet.

"Being arranged in a direction in which a long side is parallel to a surface of the first magnetic sheet" represents not only a case where the metal magnetic powder is arranged in a state where a long side thereof is parallel to a plane direction of the first magnetic sheet but also a case where an angle θ between the plane direction of the first magnetic sheet and a direction of a long side in each of one surface and another surface of the first magnetic sheet is arranged in a state where it is tilted in a range of $0°≤θ≤15°$.

"Being arranged in a direction in which a long side is parallel to a normal direction of the first magnetic sheet" represents not only a case where the metal magnetic powder is arranged in a state where a long side thereof is parallel to a normal direction of the first magnetic sheet but also a case where an angle θ between the normal direction of the first magnetic sheet and a direction of a long side in each of one surface and another surface of the first magnetic sheet is arranged in a state where it is tilted in a range of $0°≤θ≤15°$.

From the viewpoint of the effects, it is preferable that θ representing the tilt of the metal magnetic powder is as small as possible.

The power supply member according to the present disclosure will be described with reference to the drawings.

Figure 1B:
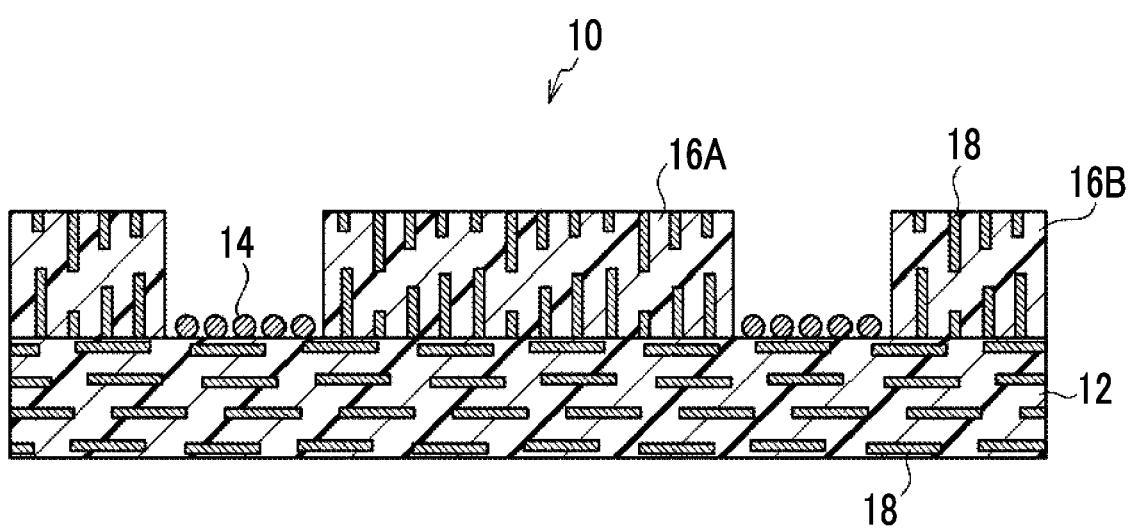
FIG. 1B is a schematic cross-sectional view showing the power supply member shown in FIG. 1A.

FIG. 1A is a perspective view showing one embodiment of a power supply member 10 according to the present disclosure. FIG. 1B is a schematic cross-sectional view showing an example of the power supply member 10 according to the embodiment of the present disclosure shown in FIG. 1A.

As shown in FIG. 1A, the power supply member 10 includes: a flat first magnetic sheet 12; and a coil 14 that is wound around and arranged on one surface of the first magnetic sheet 12.

The first magnetic sheet is positioned on a side of the power supply member 10 opposite to a direction in which a magnetic field is formed in a power reception member direction and is positioned on a back surface of the power supply member 10. Therefore, hereinafter, the first magnetic sheet will also be referred to as "back surface magnetic sheet".

In addition, the metal magnetic powder where a ratio of a length of a long side to a length of a short side is more than 1.0 will also be referred to as "specific metal magnetic powder".

The power supply member 10 shown in FIG. 1A includes: a second magnetic sheet 16A that is positioned on the same surface as the surface of the first magnetic sheet 12 where the coil 14 is arranged and is arranged on a side of the wound and arranged coil 14 inside of an inner peripheral end of the first magnetic sheet 12; and a second magnetic sheet 16B that is arranged on a side of the coil outside of an outer peripheral end of the first magnetic sheet 12.

FIG. 1B is a schematic cross-sectional view showing the power supply member 10 shown in FIG. 1A. As schematically shown in FIG. 1B, metal magnetic powder 18 (specific metal magnetic powder) is arranged in the first magnetic sheet 12 in a direction in which a long side is parallel to a surface of the first magnetic sheet 12.

In both the second magnetic sheet 16A on the inner peripheral side of the coil 14 and the second magnetic sheet 16B on the outer peripheral side of the coil 14, the metal magnetic powder 18 is arranged in the direction in which a long side is parallel to a normal line of the first magnetic sheet.

In FIG. 1B, the coil 14 is shown in a circular cross-section.

As shown in FIG. 1B, a height of each of the second magnetic sheets 16A and 16B from the surface of the first magnetic sheet 12 is more than a distance from the surface of the first magnetic sheet where the coil is arranged to a top of the coil from the viewpoint of further increasing the Q value.

Here, the height of the second magnetic sheet from the first magnetic sheet refers to the distance from the surface of the first magnetic sheet, that is, the bottom surface of the second magnetic sheet to the top surface of the second magnetic sheet.

The wound coil 14 may be arranged on one surface of the first magnetic sheet 12. The coil 14 may be fixed to the first magnetic sheet 12, for example, using an adhesive or the like, or may be fixed to the first magnetic sheet 12 by burying a part thereof in the first magnetic sheet 12.

In each conductor wire portion forming the coil, it is preferable that the coil 14 is arranged on the surface of the first magnetic sheet in a state where the coil 14 is not buried in the first magnetic sheet 12 from the viewpoint of aligning a direction of a magnetic field generated in a conductor wire peripheral direction and a long side direction of a magnetic body in the magnetic sheet.

The details of the first magnetic sheet 12 and the second magnetic sheets 16A and 16B, and the resin composition including the metal magnetic powder and the resin that is used for forming the second magnetic sheet will be described below.

Figure 2:
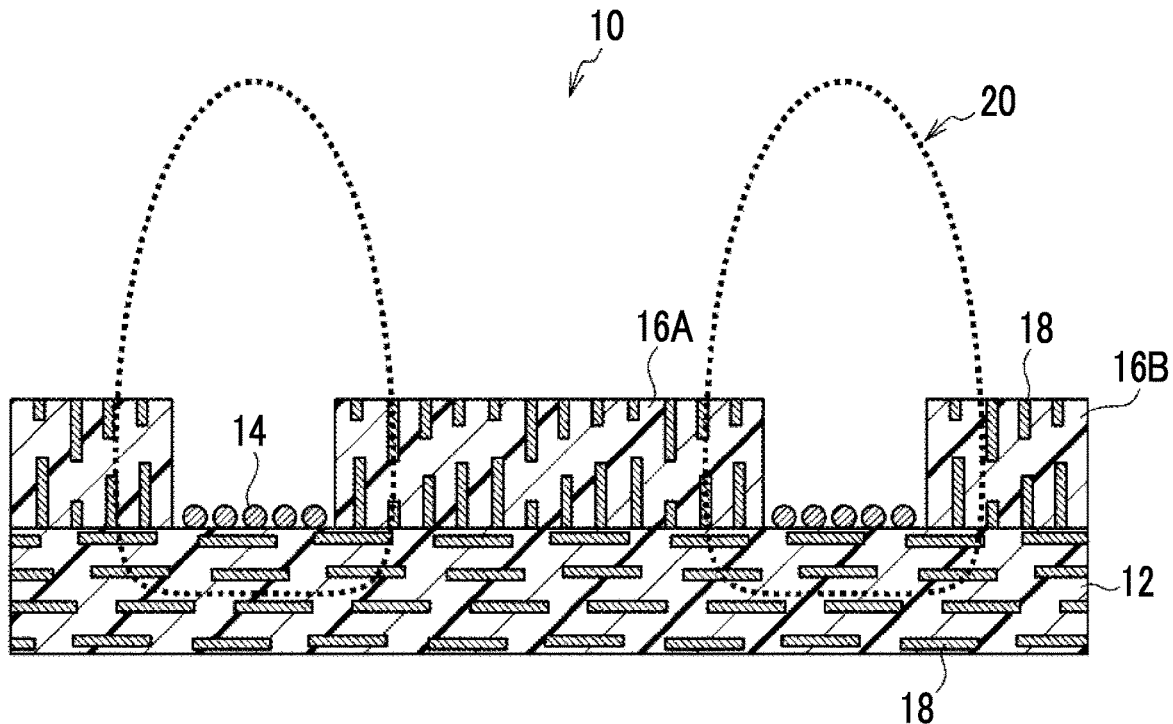
FIG. 2 is a schematic cross-sectional view schematically showing the power supply member shown in FIG. 1B and a magnetic field generated from the power supply member.

For example, in the aspect of the power supply member shown in FIGS. 1A and 1B, in a case where the coil 14 is energized, a magnetic field 20 is likely to be formed in the direction in which the metal magnetic powder 18 in the first magnetic sheet 12, the second magnetic sheet 16A, and the second magnetic sheet 16B is arranged, that is, in the direction in which a long side of the metal magnetic powder 18 is arranged. In FIG. 2, the magnetic field 20 that is formed in a case where the coil 14 of the power supply member shown in FIG. 1B is energized is schematically indicated by a dotted line.

As shown in FIG. 2, the magnetic field 20 is formed in the long side direction of the metal magnetic powder 18, and the high magnetic field 20 is formed on the power reception member side. On the other hand, the magnetic field 20 is not formed on a side below the back surface magnetic sheet as the first magnetic sheet 12. Therefore, it is considered that in the power supply member according to the embodiment of the present disclosure, high efficiency power supply is performed, and a high Q value is achieved.

In addition, a magnetic field is not formed on a surface of the first magnetic sheet 12 as the back surface magnetic sheet where the coil is not formed, that is, on a so-called back surface of the first magnetic sheet. Therefore, for example, even in a case where a metal plate or the like as the substrate is arranged on the back surface of the power supply member, the probability that the arranged metal plate or the like is affected by an undesired magnetic field decreases, which is not preferable.

The Q value of the power supply member can be measured by connecting both ends of the coil of the power supply member to an LCR meter. In the present disclosure, by applying a current of 100 kHz to the LCR meter, the Q value of the power supply member at 100 kHz is measured.

As the LCR meter, a well-known device can be used. For example, IM3536 (trade name, manufactured by Hioki E.E. Corporation) can be used.

Specific detailed conditions are as follows.

A 4-terminal probe L2000 (manufactured by Hioki E.E. Corporation) is connected to the LCR meter (IM3536: trade name, manufactured by Hioki E.E. Corporation), and the two measurement probes L2000 and electrodes at both ends of the coil are connected. The Q value is measured by setting a measurement frequency to 100 kHz and a measurement voltage to 1 V.

The measurement is performed at normal temperature (25° C.).

In the present disclosure, as a measure representing the Q value in the power supply member is excellent, the Q value of the power supply member having the configuration according to the present disclosure with respect to the Q value of a power supply member having a standard configuration where only the coil is arranged on the surface of the back surface magnetic sheet is preferably 1.03 or higher and more preferably 1.09 or higher.

In addition, the relative improvement ratio of the Q value of the power supply member according to the embodiment of the present disclosure with respect to the relative improvement ratio of the Q value of a power supply member according to a comparative example other than the present disclosure is preferably 0.01 or higher, more preferably 0.03 or higher, and still more preferably 0.05 or higher.

In the aspect shown in FIG. 1A, the coil 14 is wound in a circular shape. In addition, the second magnetic sheets 16A and 16B are provided on a side inside of the inner periphery of the region where the coil 14 is arranged and a side outside of the outer periphery of the region, respectively. However, the power supply member according to the present disclosure is not limited to the aspect shown in FIGS. 1A and 1B as described below in detail.

Modification examples of the power supply member will be described below with reference to the drawings.

Figure 3:
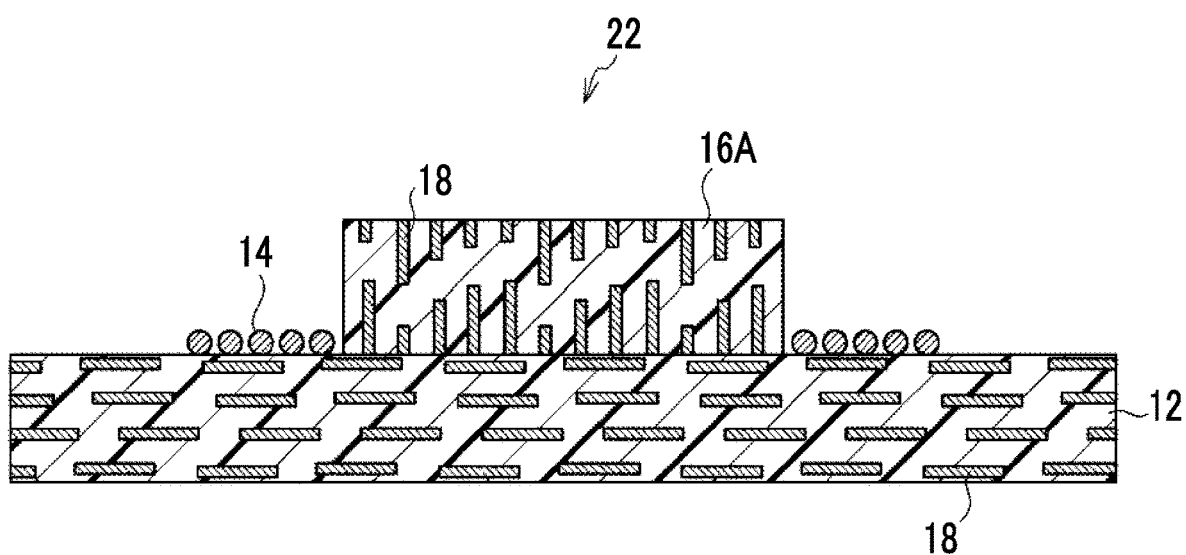
FIG. 3 is a schematic cross-sectional view showing one example of a power supply member including the second magnetic sheet on only a side inside of an inner peripheral end of a region where a coil is arranged in another embodiment of the power supply member according to the present disclosure.

FIG. 3 is a schematic cross-sectional view showing an example of another embodiment of the power supply member according to the present disclosure. In a power supply member 22 shown in FIG. 3, the second magnetic sheet 16A is provided on only a side inside of the inner peripheral end of the wound coil in the region where the coil 14 is arranged that is provided on the surface of the back surface magnetic sheet 12.

The second magnetic sheet 16A in FIG. 3 has a columnar shape, which is the same as that of the second magnetic sheet 16A in FIG. 1B that is arranged inside of the inner peripheral end of the region where the coil 14 is arranged.

Figure 4:
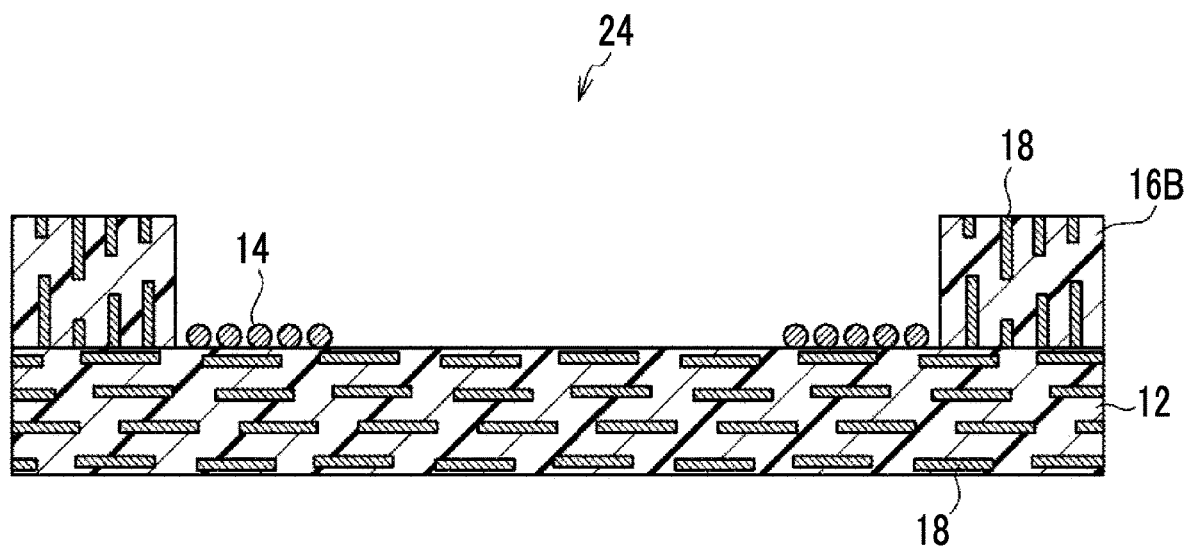
FIG. 4 is a schematic cross-sectional view showing one example of a power supply member including the second magnetic sheet on only a side outside of an outer peripheral end of a region where a coil is arranged in still another embodiment of the power supply member according to the present disclosure.

FIG. 4 is a schematic cross-sectional view showing an example of still another embodiment of the power supply member according to the present disclosure. In a power supply member 24 shown in FIG. 4, the second magnetic sheet 16B is provided on only a side outside of the outer peripheral end of the wound coil 14 in the region where the coil is arranged. The second magnetic sheet 16B in FIG. 4 has the same shape as that of the second magnetic sheet 16B in FIG. 1B that is arranged outside of the outer peripheral end of the region where the coil 14 is arranged.

As shown in FIGS. 3 and 4, the second magnetic sheet may be arranged on only the side inside of the inner peripheral end of the wound coil or only the side outside of the outer peripheral end of the wound coil in the region where the coil is arranged.

Figure 5:
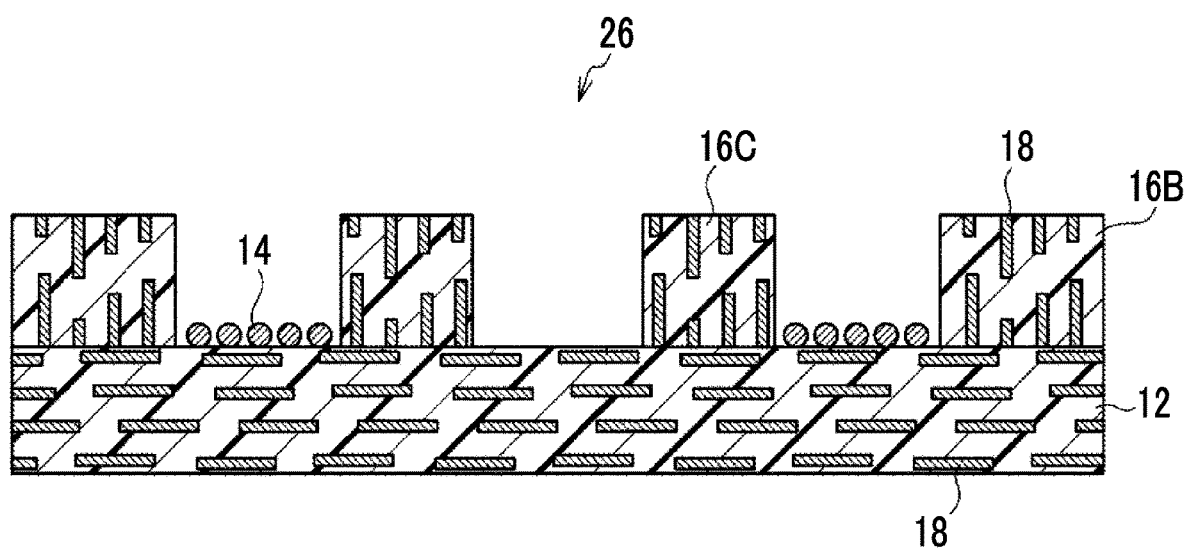
FIG. 5 is a schematic cross-sectional view showing one example of a power supply member including the second magnetic sheet on both a side inside of an inner peripheral end of a region where a coil is arranged and a side outside of an outer peripheral end of the region in still another embodiment of the power supply member according to the present disclosure, in which the second magnetic sheet formed on the side inside of the inner peripheral end has a void at a center portion.

FIG. 5 is a schematic cross-sectional view showing an example of still another embodiment of the power supply member according to the present disclosure. In a power supply member 26 shown in FIG. 5, a second magnetic sheet 16C having a cylindrical shape is provided on a side inside of the inner peripheral end of the region where the coil is arranged, and the second magnetic sheet 16B is provided on a side outside of the outer peripheral end of the region where the coil 14 is arranged.

In the power supply member 26 shown in FIG. 5, the second magnetic sheet 16B that is arranged on the side outside of the outer peripheral end of the region where the coil is arranged has the same shape as that of the second magnetic sheet 16B shown in FIGS. 1B and 4.

In the power supply member 26 shown in FIG. 5, the second magnetic sheet 16C that is provided on only the side inside of the inner peripheral end of the wound coil in the region where the coil is arranged has a cylindrical shape. That is, for example, unlike the second magnetic sheet 16A having a columnar shape shown in FIG. 3, a region not including the second magnetic sheet is present on a side inside of an inner peripheral end of the second magnetic sheet 16C.

In each of the embodiments, the coil is wound in a circular shape, and the aspect where the coil is wound is not limited to the above-described examples.

As a long as the coil functions, the winding aspect and the winding number of the coil (conductive wire) can be appropriately selected depending on the intended purpose of each of the power supply members.

Figure 6A:
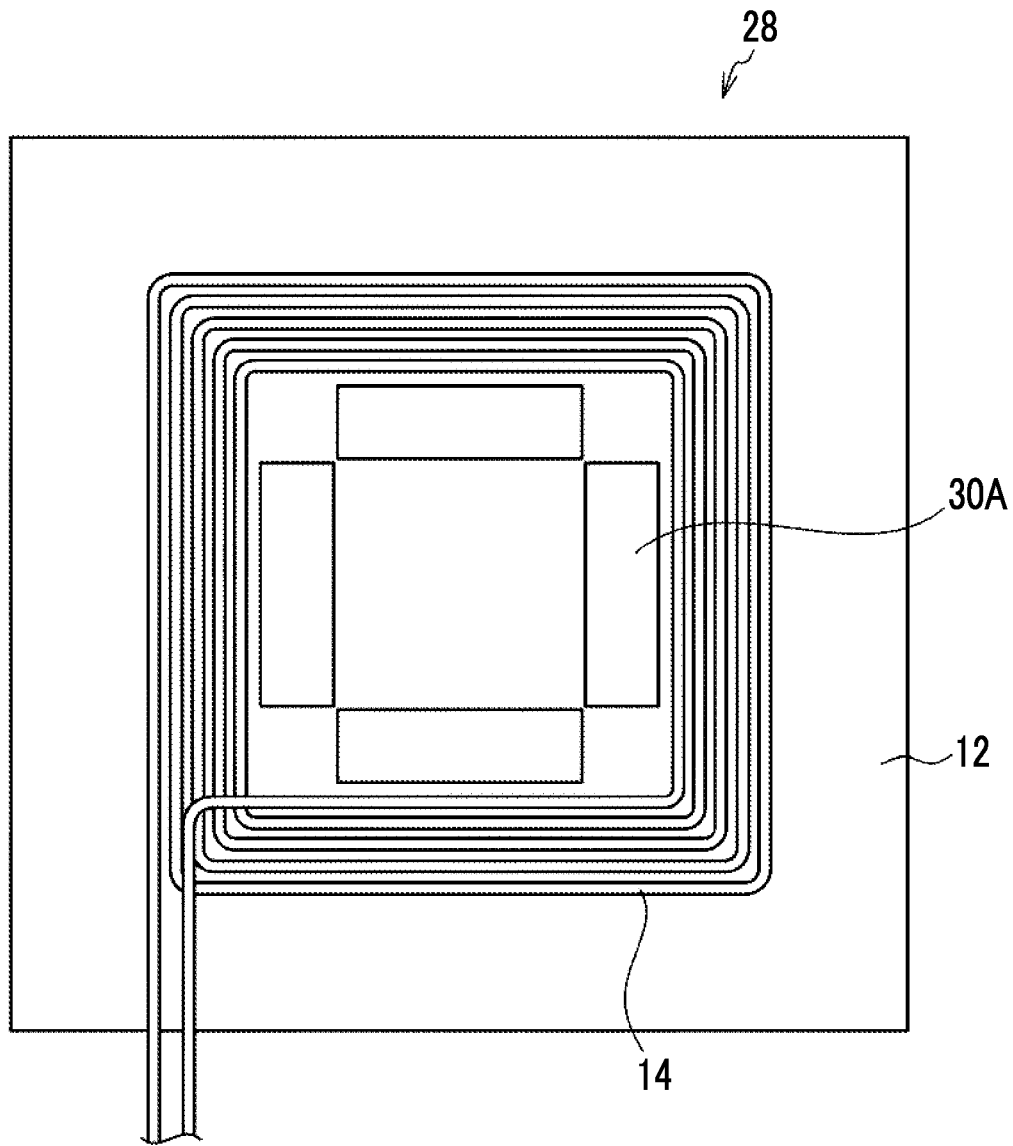
FIG. 6A is a plan view showing one example of a power supply member including the second magnetic sheet on a side inside of an inner peripheral end of a region where a coil is rectangularly wound and arranged in one embodiment of the power supply member according to the present disclosure.

FIG. 6A is a plan view showing one embodiment of the power supply member according to the present disclosure.

In a power supply member 28 shown in FIG. 6A as an example, the coil 14 is rectangularly wound around one surface of the first magnetic sheet (back surface magnetic sheet) 12.

Four second magnetic sheets 30A are provided on a side inside of the inner peripheral end of the wound coil of the region where the coil 14 is arranged. As shown in FIG. 6A, the second magnetic sheet 30A has a rectangular shape, and the four second magnetic sheets 30A are arranged at positions along the inner periphery of the wound coil 14 on the side inside of the inner periphery of the coil 14.

The second magnetic sheets 30A are not necessarily continuously provided and may be arranged to be spaced from each other as shown in FIG. 6A.

Figure 6B:
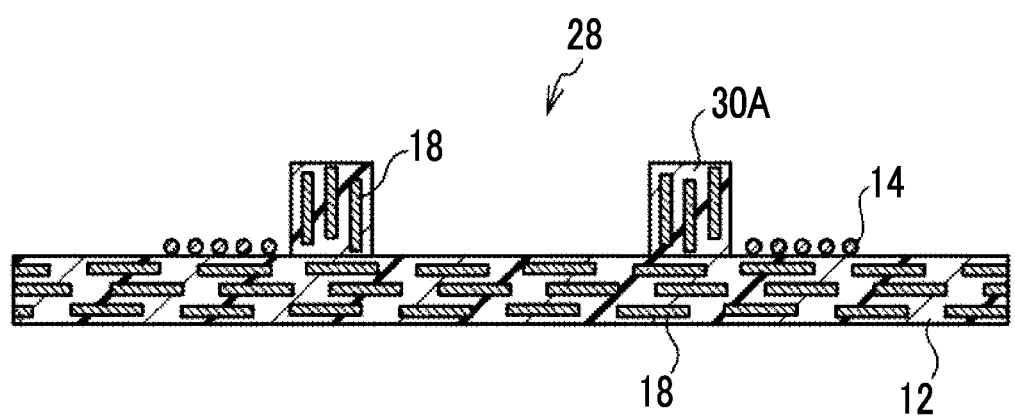
FIG. 6B is a schematic cross-sectional view showing the power supply member shown in FIG. 6A.

FIG. 6B is a schematic cross-sectional view showing the power supply member 28 in the plan view of FIG. 6A.

Figure 7A:
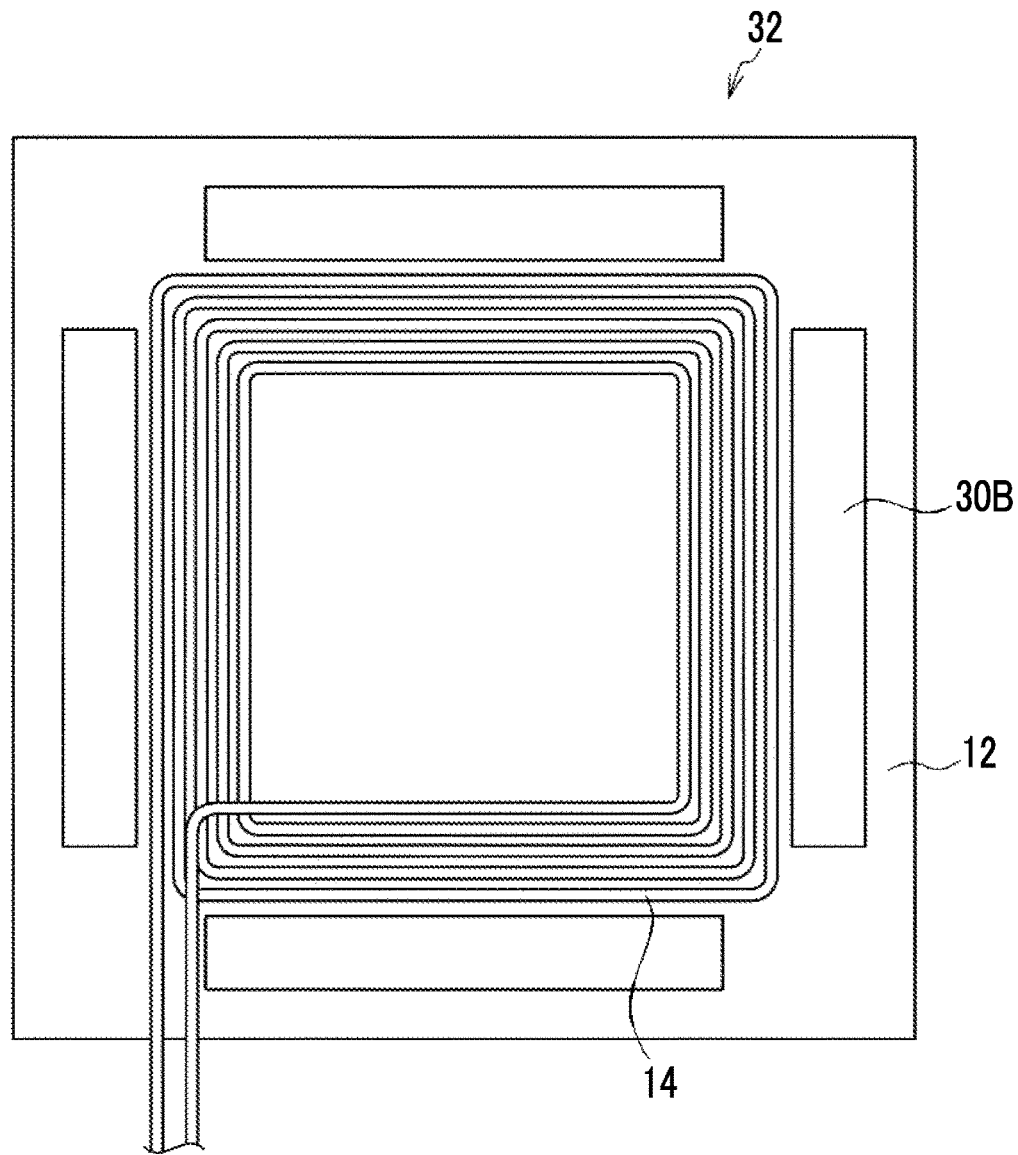
FIG. 7A is a plan view showing one example of a power supply member including the second magnetic sheet on a side outside of an outer peripheral end of a region where a coil is rectangularly wound and arranged in one embodiment of the power supply member according to the present disclosure.

FIG. 7A is a plan view showing one embodiment of the power supply member according to the present disclosure. In a power supply member 32 shown in FIG. 7A as an example, the coil 14 is rectangularly wound around one surface of the first magnetic sheet (back surface magnetic sheet) 12.

Four second magnetic sheets 30B are provided on a side outside of the outer peripheral end of the wound coil of the region where the coil 14 is arranged. As in the power supply member 32, the second magnetic sheet 30B has a rectangular shape, and the four second magnetic sheets 30B are arranged at positions along the outer periphery of the wound coil 14 on the side outside of the outer periphery of the coil 14.

The second magnetic sheets 30B provided on the side outside of the outer periphery of the coil 14 are not necessarily continuously provided and may be arranged to be spaced from each other as shown in FIG. 7A.

Figure 7B:
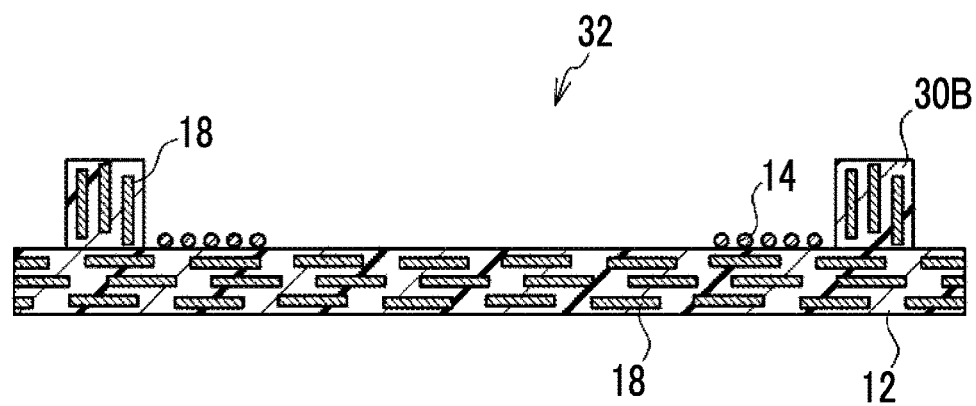
FIG. 7B is a schematic cross-sectional view showing the power supply member shown in FIG. 7A.

FIG. 7B is a schematic cross-sectional view showing the power supply member 32 in the plan view of FIG. 7A.

Figure 8A:
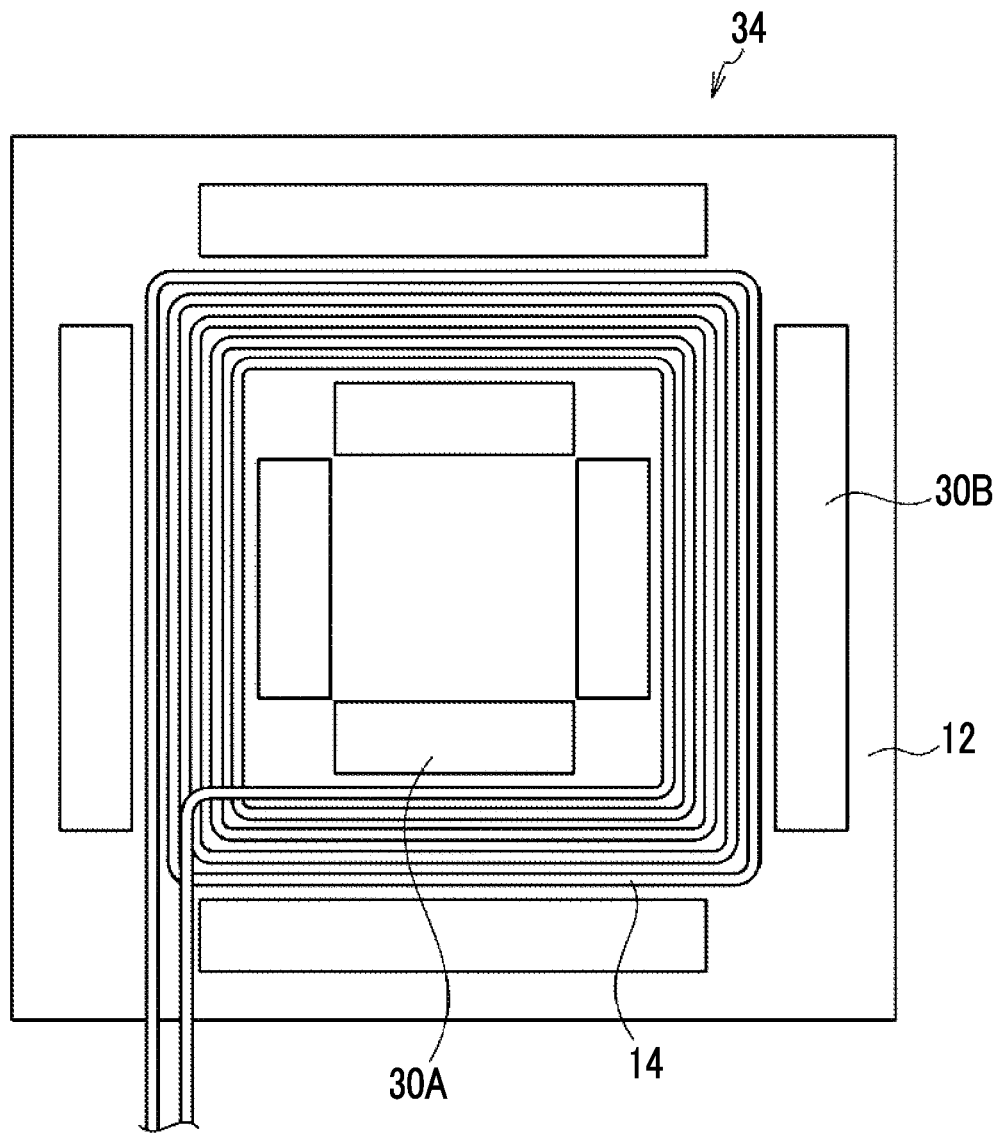
FIG. 8A is a plan view showing one example of a power supply member including the second magnetic sheet on both a side inside of an inner peripheral end of a region where a coil is rectangularly wound and arranged and a side outside of an outer peripheral end of the region in one embodiment of the power supply member according to the present disclosure.

FIG. 8A is a plan view showing one embodiment of the power supply member according to the present disclosure. In a power supply member 34 shown in FIG. 8A as an example, the coil 14 is rectangularly wound around one surface of the first magnetic sheet (back surface magnetic sheet) 12.

Four second magnetic sheets 30A are provided on a side inside of the inner peripheral end of the region where the coil 14 is arranged, and four second magnetic sheets 30B are provided on a side outside of the outer peripheral end of the region where the coil 14 is arranged. That is, in the power supply member 34, the second magnetic sheets 30A and 30B having a rectangular shape are arranged at positions along the wound coil 14 on the side inside of the inner periphery of the wound coil 14 and the side outside of the outer periphery of the wound coil 14, respectively.

Figure 8B:
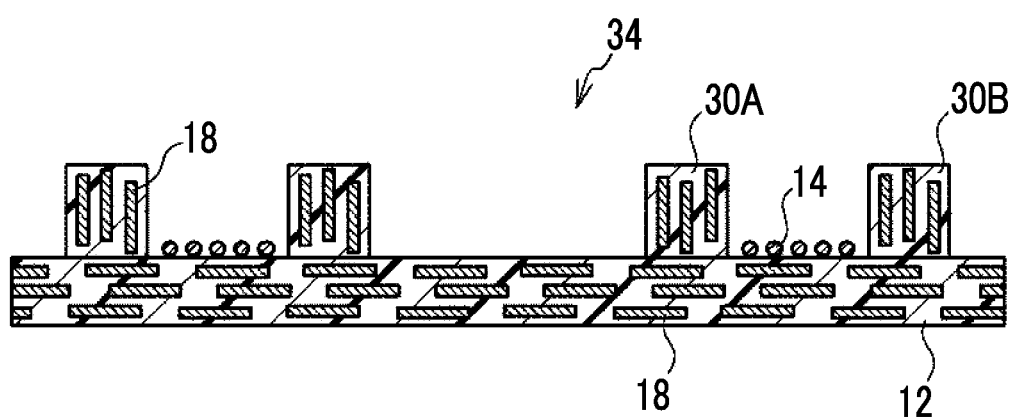
FIG. 8B is a schematic cross-sectional view showing the power supply member shown in FIG. 8A.

FIG. 8B is a schematic cross-sectional view showing the power supply member shown in FIG. 8A.

Figure 9A:
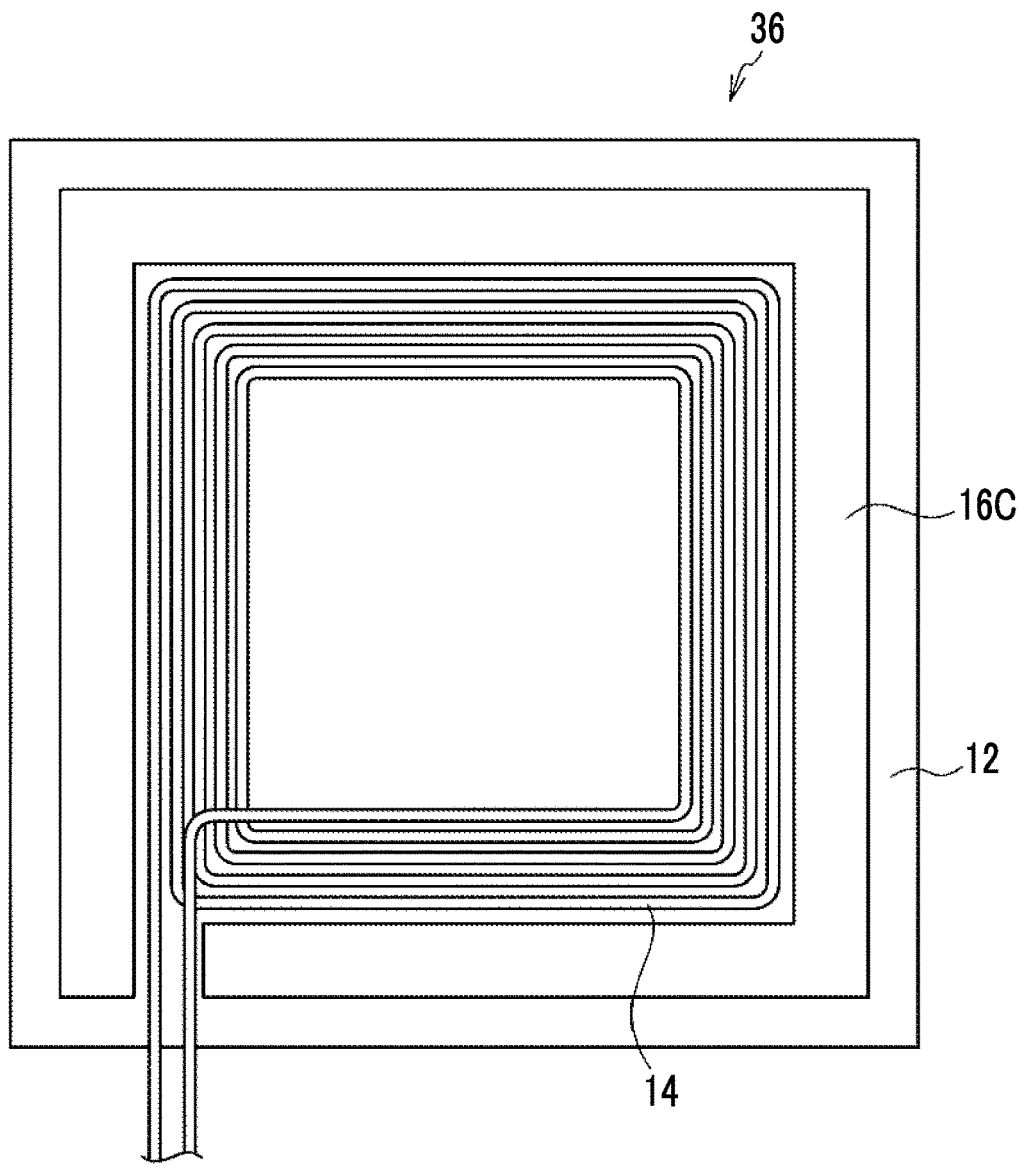
FIG. 9A is a plan view showing one example of a power supply member including the second magnetic sheet on a side outside of an outer peripheral end of a region where a coil is rectangularly wound and arranged in one embodiment of the power supply member according to the present disclosure, in which the second magnetic sheet is continuously provided in the outer periphery other than a conductive path for connecting an end portion of the coil to a power supply.

FIG. 9A is a plan view showing one embodiment of the power supply member according to the present disclosure. In a power supply member 36 shown in FIG. 9A as an example, the coil 14 is rectangularly wound around one surface of the first magnetic sheet (back surface magnetic sheet) 12.

The second magnetic sheets 16C is provided on a side outside of the outer peripheral end of the region where the coil 14 is arranged. In the power supply member 36, the second magnetic sheet 16C is continuously provided at a position along the wound coil 14 in a region other than the conductive path of the coil on the side outside of the outer periphery of the wound coil 14.

Figure 9B:
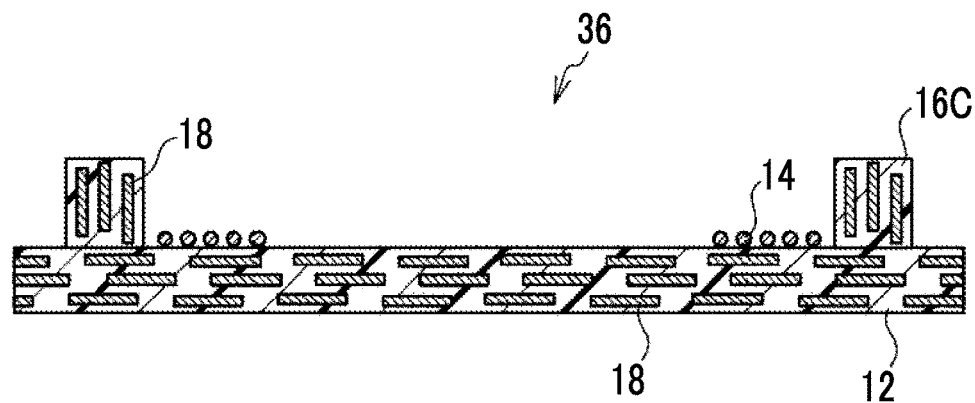
FIG. 9B is a schematic cross-sectional view showing the power supply member shown in FIG. 9A.

FIG. 9B is a schematic cross-sectional view showing the power supply member shown in FIG. 9A.

In the second magnetic sheet of the power supply member according to the embodiment of the present disclosure, the specific metal magnetic powder in the first magnetic sheet is arranged in the direction in which a long side is parallel to the surface of the first magnetic sheet, whereas the specific metal magnetic powder in the second magnetic sheet is arranged in the direction in which a long side is parallel to the normal direction of the first magnetic sheet. As a result, a suitable magnetic field can be easily formed, and a satisfactory Q value can be obtained.

Hereinafter, the aspects of the second magnetic sheet that is applicable to the power supply member according to the embodiment of the present disclosure will be described.

One embodiment (first embodiment) of the second magnetic sheet is a resin sheet that is arranged on the same surface of the first magnetic sheet as the surface where the coil is arranged and where a long side of the specific metal magnetic powder is arranged in a direction parallel to the normal direction of the first magnetic sheet.

In the first embodiment of the second magnetic sheet, the resin sheet including the specific metal magnetic powder arranged in the direction in which a long side is parallel to the normal direction of the first magnetic sheet is the second magnetic sheet. By arranging the resin sheet including the specific metal magnetic powder arranged in the direction in which a long side is parallel to the normal direction of the first magnetic sheet at any position, the second magnetic sheet having a desired shape can be formed in a desired region.

Another embodiment (second embodiment) of the second magnetic sheet is a resin sheet having a helical structure that is arranged on the same surface of the first magnetic sheet as the surface where the coil is arranged and includes specific metal magnetic powder arranged in the direction in which the long side is parallel to the normal direction of the first magnetic sheet.

In the second embodiment in which the resin sheet having a helical structure is formed by helically winding the resin sheet including the specific metal magnetic powder arranged in the direction in which a long side is parallel to the normal direction of the first magnetic sheet, for example, the shape of the second magnetic sheet 16A shown in FIGS. 1A, 1B, and 3 described above can be easily formed.

Still another embodiment (third embodiment) of the second magnetic sheet is a resin sheet having a folded structure that is arranged on the same surface of the first magnetic sheet as the surface where the coil is arranged and includes specific metal magnetic powder arranged in a direction in which a long side is parallel to a surface of the magnetic sheet.

Figure 12:
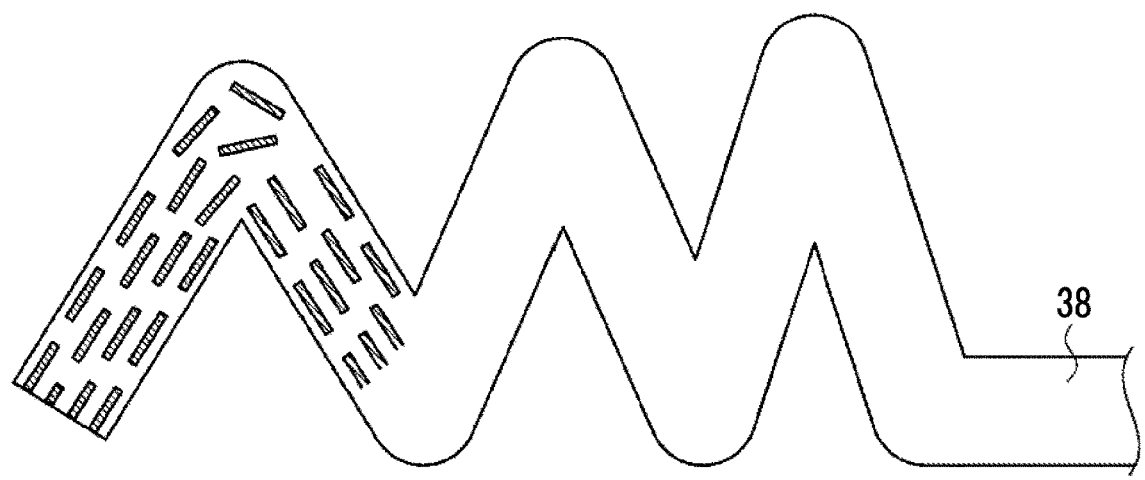
FIG. 12 is a schematic cross-sectional view showing an example of an aspect where a second magnetic sheet having a folded structure is formed by cutting a magnetic sheet where a long side is arranged in a direction parallel to a surface of the magnetic sheet to obtain a cut piece and folding the cut piece in one embodiment of a method of manufacturing a magnetic sheet for coil arrangement according to the present disclosure.
Figure 12:
Figure 12:
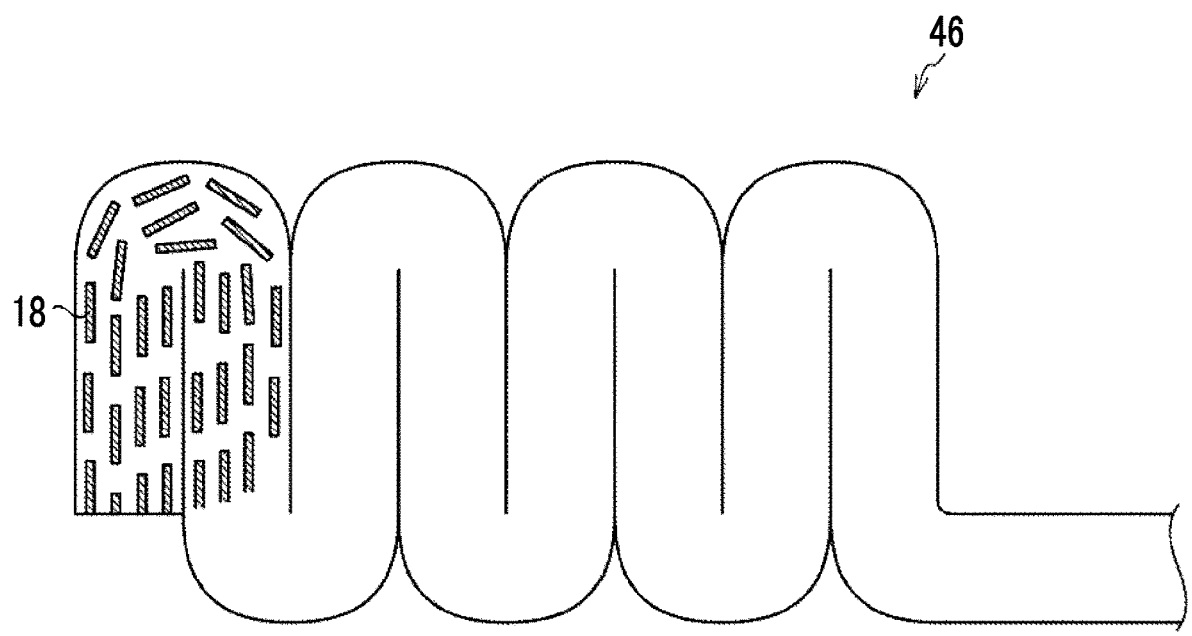

By folding, in a zigzag manner, the magnetic sheet that includes metal magnetic powder arranged in the direction in which the long side is parallel to the surface of the magnetic sheet to obtain the folded structure, as shown in FIG. 12 as an example, the specific metal magnetic powder arranged in the direction parallel to the surface of the magnetic sheet is arranged in the direction in which the long side is parallel to the normal direction of the first magnetic sheet, and thus the second magnetic sheet is simply formed.

In the third embodiment where the resin sheet having the folded structure is used, for example, the shapes the second magnetic sheet 30A, the second magnetic sheet 30B, and the like shown in FIGS. 6A, 6B, 7A, 7B, 8A, and 8B described above can be easily formed.

Still another embodiment (fourth embodiment) of the second magnetic sheet is an aspect where the second magnetic sheet is formed of bending portions of a pair of side end portions of the first magnetic sheet facing each other.

That is, by folding the pair of side end portion of the first magnetic sheet facing each other from a plane direction of the first magnetic sheet to form the bending portions, in the bending portion region, the long side of the specific metal magnetic powder is arranged in the direction parallel to the normal direction of the first magnetic sheet, and thus the second magnetic sheet is formed.

Still another embodiment (fifth embodiment) of the second magnetic sheet is an aspect where the second magnetic sheet is formed in a peripheral portion of a substrate. Specifically, in this aspect, the second magnetic sheet is a resin sheet that is provided in an outer peripheral portion of a cylindrical substrate or a columnar substrate arranged on one surface of the first magnetic sheet and includes metal magnetic powder arranged in a direction in which a long side is parallel to a surface of the second magnetic sheet.

By selecting a substrate having any shape such as a cylindrical shape, a columnar shape, or a prismatic shape as the substrate, the second magnetic sheet having a desired shape can be formed.

In the power supply member according to the embodiment of the present disclosure, each of the alignment directions of the long side of the specific metal magnetic powder in the first magnetic sheet and the second magnetic sheet is adjusted to and included in the direction defined by the present disclosure. Therefore, a satisfactory Q value can be imparted to the power supply member.

[Magnetic Sheet for Coil Arrangement]

Next, the magnetic sheet for coil arrangement according to the embodiment of the present disclosure will be described.

The magnetic sheet for coil arrangement according to the embodiment of the present disclosure is a magnetic sheet for coil arrangement of a power supply member used in a wireless power supply system where power is transmitted and received between a pair of coils distant from each other, the magnetic sheet comprising: a first magnetic sheet that includes metal magnetic powder where a ratio of a length of a long side to a length of a short side is more than 1.0 and a resin; a region that is formed on one surface of the first magnetic sheet and where a coil for forming a magnetic field is arranged; a second magnetic sheet that is arranged on at least one of a side inside of an inner peripheral end of the coil or a side outside of an outer peripheral end of the coil in the region of the first magnetic sheet where the coil is arranged and includes metal magnetic powder where a ratio of a length of a long side to a length of a short side is more than 1.0 and a resin, in which the metal magnetic powder in the first magnetic sheet is arranged in a direction in which the long side is parallel to a surface of the first magnetic sheet, and the metal magnetic powder in the second magnetic sheet is arranged in a direction in which the long side is parallel to a normal direction of the first magnetic sheet.

The magnetic sheet for coil arrangement according to the embodiment of the present disclosure is the same as the above-described power supply member according to the embodiment of the present disclosure, except that the region for arranging the coil is provided without including the coil.

The magnetic sheet for coil arrangement according to the embodiment of the present disclosure includes: the first magnetic sheet as the back surface magnetic sheet that holds the coil on one surface; and the second magnetic sheet that is provided on at least one of a side inside of an inner peripheral end of the coil to be arranged in the region for arranging the coil or a side outside of an outer peripheral end of the coil.

By arranging the coil in the region for arranging the coil that is provided on the surface of the first magnetic sheet in the magnetic sheet for coil arrangement according to the embodiment of the present disclosure, the power supply member can be obtained.

The coil can be wound and arranged in the region for arranging the coil in any shape and any winding number depending on the intended purpose of the power supply member. By arranging the wound coil, the magnetic sheet for coil arrangement according to the embodiment of the present disclosure is the power supply member.

In the magnetic sheet for coil arrangement according to the embodiment of the present disclosure, each of the alignment directions of the long side of the specific metal magnetic powder in the first magnetic sheet and the second magnetic sheet is adjusted to and included in the direction defined by the present disclosure. By arranging the coil in the magnetic sheet for coil arrangement according to the embodiment of the present disclosure, a power supply member that can realize a satisfactory Q value can be obtained.

As described above with reference to FIG. 2, from the viewpoint that a more suitable magnetic field can be formed to realize a satisfactory Q value, a magnetic permeability $\mu'$ [H/m] of the first magnetic sheet and a thickness t [m] of the first magnetic sheet in the magnetic sheet for coil arrangement satisfy preferably a relationship of the following Expression 1, more preferably a relationship of the following Expression 2, and still more preferably a relationship of the following Expression 3.

In order to represent the magnetic permeability of the magnetic sheet, the magnetic permeability may be represented by an absolute value "$\mu$" or may be represented by a relative magnetic permeability "$\mu r$" as a relative value to air. A measured value of the magnetic permeability in the present disclosure is represented by "$\mu$" as the absolute value.

$$\mu'[H/m] \times t[m] \geq 1.2 \times 10^{-7}[H] \quad \text{(Expression 1)}$$

$$\mu'[H/m] \times t[m] \geq 1.3 \times 10^{-7}[H] \quad \text{(Expression 2)}$$

$$\mu''[H/m] \times t[m] \geq 1.4 \times 10^{-7}[H] \quad \text{(Expression 3)}$$

In addition, from the viewpoint that permeation of a magnetic field in the power supply member to the back surface of the first magnetic sheet as the back surface magnetic sheet can be more effectively suppressed, the thickness t of the first magnetic sheet is preferably $0.5 \times 10^{-3}$ m or more, more preferably $1.5 \times 10^{-3}$ m or more, and still more preferably $2.0 \times 10^{-3}$ m or more. That is, in a case where the thickness of the first magnetic sheet is represented in units of [mm], the thickness of the first magnetic sheet is preferably 0.5 mm or more, more preferably 1.5 mm or more, and still more preferably 2.0 mm or more.

The upper limit of the thickness of the first magnetic sheet is not particularly limited. From the viewpoint of appropriately maintaining the size of the power supply member, the thickness t may be $1.0 \times 10^{-2}$ m or less, that is, 10 mm or less.

The first magnetic sheet and the second magnetic sheet in the magnetic sheet for coil arrangement have the same aspects and the same preferable examples as described above regarding the power supply member according to the embodiment of the present disclosure.

The first magnetic sheet and the second magnetic sheet in the power supply member and the magnetic sheet for coil arrangement include the specific metal magnetic powder and a resin.

It is preferable that the first magnetic sheet and the second magnetic sheet are formed using a resin composition including the specific metal magnetic powder and a resin.

The resin composition used for forming the magnetic sheet will be described.

The resin composition includes the specific metal magnetic powder and a resin and optionally further includes other components.

(Specific Metal Magnetic Powder)

In the power supply member according to the embodiment of the present disclosure, the specific metal magnetic powder that can be used for forming the first magnetic sheet and the second magnetic sheet is metal magnetic powder where a ratio of a length of a long side to a length of a short side is more than 1.0. That is, the specific metal magnetic powder only needs to be metal magnetic powder where a long side and a short side have different lengths instead of being spherical. By adjusting the ratio of the length of the long side to the length of the short side to be more than 1.0, the specific metal magnetic powder can be arranged in the magnetic sheet in a desired direction, and a magnetic field can be efficiently formed in the arrangement direction of the specific metal magnetic powder, which is preferable. The above-described "spherical" represents that the ratio of the length of the long side to the length of the short side in the metal magnetic powder is 1.0.

The metal magnetic powder is formed of fine particles of solid magnetic metal.

"Short side" of the specific metal magnetic powder refers to the distance corresponding to the thickness, and "long side" of the specific metal magnetic powder refers to the longest distance in a main surface having the widest area in the particle.

As the magnetic metal forming the specific metal magnetic powder, any magnetic material can be used. In particular, a soft magnetic material is preferable from the viewpoint of obtaining a higher magnetic permeability.

Examples of the soft magnetic material that is applicable to the specific metal magnetic powder include magnetic stainless steel (Fe—Cr—Al—Si alloy), Sendust (Fe—Si—Al alloy), Permalloy (Fe—Ni alloy), silicon copper (Fe—Cu—Si alloy), a Fe—Si alloy, a Fe—Si—B (—Cu—Nb) alloy, a Fe—Si—Cr—Ni alloy, a Fe—Si—Cr alloy, a Fe—Si—Al—Ni—Cr alloy, and ferrite.

In the magnetic sheet prepared using the soft magnetic powder formed of the soft magnetic material, the soft magnetic powder has excellent soft magnetic properties. The soft magnetic powder is suitable as the specific metal magnetic powder of the power supply member.

In particular, from the viewpoint of magnetic properties, for example, Sendust (Fe—Si—Al alloy) is preferable as the magnetic metal.

The shape of the specific metal magnetic powder is not particularly limited as long as it is metal magnetic powder where a ratio of the length of a long side to the length of a short side in the projection diagram is more than 1.0. The ratio of the length of the long side to the length of the short side is preferably 1.1 to 200 and more preferably 1.2 to 100.

Examples of the shape of the specific metal magnetic powder include an acicular shape, a rod shape, an elliptical rugby ball shape in the projection diagram, a conical shape, and a flat shape.

From the viewpoints that a diamagnetic field in a major axis direction decreases due to a flat shape to obtain a higher magnetic permeability and that suitable alignment for improving the Q value can be easily controlled, it is preferable that the specific metal magnetic powder is specific metal magnetic powder having a flat shape (flat metal magnetic powder).

"The ratio of the length of the long side to the length of the short side" in the flat metal magnetic powder is represented by "flatness ratio (flatness degree)".

The flat shape refers to a flat shape (also referred to as "plate shape") having two main surfaces having a wide area opposite to each other. A shape of the main surfaces may be any one of a rectangular shape, a circular shape, an elliptical shape, a triangular shape, a trapezoidal shape, or an unstructured shape.

"Short side" of the flat metal magnetic powder refers to the distance corresponding to the thickness.

"Long side" of the flat metal magnetic powder refers to the longest distance in the main surface. For example, in a case where the shape of the main surface is rectangular, the long side refers to the length of the longest diagonal line (in the case of a square shape, the length of a diagonal line). In a case where the shape of the main surface is circular, the long side refers to the diameter. In a case where the shape of the main surface is elliptical, the long side refers to the diameter. In addition, in a case where the shape of the main surface is unstructured, the long side refers to the longest distance measured from the main surface.

The flatness ratio (flatness degree) of the flat metal magnetic powder is, for example, 8 or more and preferably 15 or more and is, for example, 80 or less and preferably 65 or less. For example, the flatness ratio is calculated as an aspect ratio obtained by dividing the average particle size (average length) of the metal magnetic powder by the average thickness of the metal magnetic powder.

The average particle size of the specific metal magnetic powder (average length is preferably 1 µm or more, more preferably 3.5 µm or more, and still more preferably 10 µm or more. In addition, the average length of the specific metal magnetic powder is, for example, preferably 200 µm or less and more preferably 100 µm or less.

The average thickness of the flat metal magnetic powder is preferably 0.3 µm or more and more preferably 0.5 µm or more. In addition, the average thickness is preferably 3 µm or less and more preferably 2.5 µm or less.

The average particle size (average length) of the specific metal magnetic powder is adjusted by adjusting the flatness ratio, the average particle size, the average thickness and the like of the metal magnetic powder. By adjusting the shape, the flatness ratio, the size, and the like of the specific metal magnetic powder, the influence of the shape of the specific metal magnetic powder on a diamagnetic field can be reduced, and thus the magnetic permeability of the specific metal magnetic powder can be increased.

In order to make the size of the metal magnetic powder uniform, the metal magnetic powder may be optionally classified using a sieve or the like. As the specific metal magnetic powder according to the embodiment of the present disclosure, the metal magnetic powder that is classified using a sieve or the like may be used.

In the present disclosure, specifically, the ratio of the long side to the short side and the average particle size, the average thickness, and the flatness degree (average aspect ratio) of the metal magnetic powder can be obtained using the following method.

The metal magnetic powder is imaged using a scanning electron microscope (SEM) at an imaging magnification of 1000-fold. Particles where a major axis faces the front and particles where a minor axis faces the front are selected from the image data, and the image of each of the particles is analyzed to measure a major axis length (that is, the long side), and a minor axis length (that is, the short side). By performing the measurement on each of 100 particles by simple average, that is, number average, the average particle size (average length), the average thickness, and the flatness degree (average aspect ratio: (average major axis length/average minor axis length)) can be obtained.

The specific gravity of the specific metal magnetic powder may be, for example, 5.0 or more and 8.0 or less.

As the specific metal magnetic powder, in order to improve adhesiveness between the resin substrate and the specific metal magnetic powder in the resin composition, the magnetic sheet, and the like, specific metal magnetic powder on which a surface treatment is performed may be used.

Examples of the specific metal magnetic powder on which a surface treatment is performed include specific metal magnetic powder on which a coupling treatment is performed using a coupling agent such as a silane coupling agent.

By using the specific metal magnetic powder on which a coupling treatment is performed, adhesiveness at an interface between the specific metal magnetic powder and the resin is further improved, and the specific gravity, the corrosion resistance, and the like in the obtained magnetic sheet can be further improved.

Examples of the coupling agent that can be used in the surface treatment include γ-methacryloxypropyl trimethoxy silane, γ-glycidoxypropyltrimethoxysilane, and γ-glycidoxypropylmethyldiethoxysilane.

A method of the coupling treatment is not particularly limited. Examples of the method include a method of performing the treatment on a surface of the specific metal magnetic powder in advance using the coupling agent, and a method of performing the coupling treatment on a surface of the specific metal magnetic powder by adding the coupling agent to a mixture of the specific metal magnetic powder and the resin as the substrate and mixing the components in a case where the specific metal magnetic powder and the resin are mixed. The coupling treatment on the specific metal magnetic powder may be performed using any of the methods.

(Resin)

As the resin that functions as the resin substrate in the magnetic sheet, that is, a binder resin, any resin having film forming properties can be used without any particular limitation. Examples of the binder resin include a polyester resin, a polyurethane resin, an epoxy resin, a phenolic resin, an acrylic resin, a styrene resin, and a synthetic rubber such as nitrile rubber (acrylonitrile-butadiene copolymer: NBR). Further, not only a homopolymer having a structural unit derived from the monomer forming the above-described resin but also a copolymer including a structural unit derived from the monomer forming the above-described resin as a copolymerization component can be used.

In particular, from the viewpoint of obtaining satisfactory workability during the formation of the magnetic sheet and aligning the specific metal magnetic powder with higher density, for example, a polyester resin, a copolymer formed to include a structural unit derived from an ester monomer, or a synthetic rubber is preferably used.

As the resin composition for forming the magnetic sheet, the resins may be used alone or in combination.

In a case where the polyester resin is used, a phosphorus-containing polyester resin having a phosphoric acid residue may also be used. The resin in the resin composition includes the phosphorus-containing polyester resin such that flame retardance can be imparted to the obtained magnetic sheet.

In a case where flame retardance is imparted to the magnetic sheet, not only a method of using a resin to which the above-described flame retardance is imparted but also a method of adding a flame retardant to the resin composition can be used.

In addition to the above-described resin (binder resin) as the resin substrate forming the magnetic sheet, other resins as additives can also be appropriately included, for example, in order to adjust various physical properties in the magnetic sheet.

Examples of the other resins include natural rubber, butyl rubber, isoprene rubber, chloroprene rubber, an ethylene-vinyl acetate copolymer, a polybutadiene resin, a polycarbonate resin, a thermoplastic polyimide resin, a polyamide resin (for example, nylon-6 or nylon-6,6), a phenoxy resin, a polyamide imide resin, and a fluororesin.

In a case where the resin composition includes other resins, the other resins may include one kind or two or more kinds.

The content of the other resins is preferably 30 parts by mass or less with respect to 100 parts by mass of the binder resin as the substrate from the viewpoint of film forming properties.

In the resin composition including at least the specific metal magnetic powder and the resin, the content of the specific metal magnetic powder expressed in terms of solid contents by volume is 30 vol % or higher, preferably 40 vol % or higher, and more preferably 50 vol % or higher, and is, for example, 90 vol % or lower and preferably 80 vol % or lower.

In addition, the content of the specific metal magnetic powder expressed in terms of solid contents by volume is, for example, higher than 80 mass %, preferably 85 mass % or higher, and more preferably 90 mass % or higher, and is, for example, preferably 98 mass % or lower and more preferably 95 mass % or lower.

By adjusting the content of the specific metal magnetic powder in the resin composition to be in the above-described range, magnetic properties of the obtained magnetic sheet are further improved, and the film formability of the magnetic sheet is further improved.

The volume proportion of each of the components in the specific metal magnetic powder or the like is calculated based on a theoretical volume obtained by dividing the mass of the component by the specific gravity of the component. The specific gravity of each of the components can be obtained using a catalog value or a well-known measuring method (for example, hydrometry).

(Other Components)

In addition to the specific metal magnetic powder, the resin as the substrate, and the other resins that are optionally used, the resin composition can include various well-known additives (hereinafter, also referred to as "other components") within a range where the effects do not deteriorate.

Examples of the other components include a crosslinking agent, an inorganic filler, a flame retardant, a dispersant, particles selected from the group consisting of inorganic particles and organic particles, and a solvent.

—Particles—

The resin composition may further include particles selected from the group consisting of inorganic particles and organic particles. It is preferable that the particles are dispersed particles that are dispersed in the resin as the substrate without being compatible.

The resin composition further includes the particles selected from the group consisting of inorganic particles and organic particles such that the surface of the obtained magnetic sheet is smoother. In addition, during the formation of the magnetic sheet, in a case where a resin having a large thickness is prepared by compressing a plurality of magnetic sheets, the magnetic sheet includes the particles. As a result, a jetting trace of air is not likely to remain in the resin during the compression, and a magnetic sheet having a more satisfactory external appearance can be formed. It is desirable that the particles are insulating. In addition, by adding particles of carbon black, titanium oxide, boron nitride, aluminum nitride, alumina, and the like, the flame retardance of the magnetic sheet can be improved.

—Flame Retardant—

The resin composition can include a flame retardant. As the flame retardant, any flame retardant can be used. Examples of the flame retardant that can be used in the resin composition for forming the magnetic sheet include a zinc flame retardant, a nitrogen flame retardant, and a hydroxide flame retardant. Other examples of the flame retardant include magnesium hydroxide and aluminum hydroxide.

Examples of the zinc flame retardant include zinc carbonate, zinc oxide, and zinc borate. Among these, zinc carbonate is preferable. As the nitrogen flame retardant, for example, a melamine derivative such as melamine (cyanuric triamide), ammeline (cyanuric diamide), ammelide (cyanuric monoamide), melame, melamine cyanurate, or benzoguanamine can be used. From the viewpoint of further improving dispersibility and miscibility in the polyester resin it is preferable to use melamine cyanurate as the flame retardant.

In addition, in order to improve the strength of the obtained magnetic sheet, the resin composition can include a crosslinking agent. By the resin composition including the crosslinking agent, the obtained magnetic sheet has a crosslinking structure, and the film hardness is further improved.

Examples of the crosslinking agent include blocked isocyanate. The blocked isocyanate is an isocyanate compound that is protected with a protective group capable of being dissociated (deprotected) by heating and where a reaction of an isocyanate group (—NCO) is suppressed at room temperature. The blocked isocyanate does not crosslink the resin in the resin composition at room temperature, and in a case where the blocked isocyanate is heated at a dissociation temperature or higher of the protective group, the protective group is dissociated such that the isocyanate group is activated, and a crosslinking structure is formed in the obtained magnetic sheet.

As the blocked isocyanate, an isocyanate where the dissociation temperature of the protective group is in a range of 120° C. to 160° C. is preferably used. By increasing the dissociation temperature of the protective group in the blocked isocyanate to be higher than 120° C., in a case where the resin composition is applied to, for example, a desired substrate, methyl ethyl ketone, toluene, or the like as a solvent used for adjusting the viscosity is evaporated, and the magnetic sheet can be dried. In a case where the dissociation temperature is lower than 120° C. and the magnetic sheet is dried at a temperature of higher than or equal to the boiling point of the solvent such as methyl ethyl ketone or toluene, the protective group of the blocked isocyanate is dissociated such that the crosslinking of the resin may progress.

In a case where a polyethylene terephthalate (PET) film is used as the resin substrate during the formation of the magnetic sheet on the resin substrate, the heat-resistance temperature of the PET film is 160° C. or lower, and thus it is preferable that the dissociation temperature of the protective group of the blocked isocyanate is 160° C. or lower.

The reaction of the crosslinking agent forming the crosslinking structure in the resin progresses slowly at room temperature. Therefore, by cooling the entire resin sheet to room temperature and leaving the resin sheet to stand for a long period of time after completion of the heating and drying step, the crosslinking density is improved, and the strength of the magnetic sheet is improved.

In a case where the resin composition includes the blocked isocyanate as the crosslinking agent, the content of the blocked isocyanate to be mixed is preferably 0.5 mass % or higher with respect to the resin. As a result, the sufficient effect of forming the crosslinking structure can be obtained.

(Preparation of Resin Composition)

The resin composition is prepared by mixing the specific metal magnetic powder and the resin with each other. It is preferable that the resin composition includes the specific metal magnetic powder with high density from the viewpoint of magnetic properties of the obtained magnetic sheet.

In a case where the specific metal magnetic powder and the resin are mixed, the specific metal magnetic powder may be pulverized to become fine due to a load during mixing, or the magnetic permeability may decrease due to a large strain. Accordingly, it is preferable that the resin composition is prepared by mixing the specific metal magnetic powder and the resin dissolved in a solvent under a condition that a load is not applied to the specific metal magnetic powder as far as possible during the preparation of the resin composition. It is preferable to use a resin composition including a solvent that has a relatively low viscosity, specifically, a resin composition having a preferable viscosity described below from the viewpoint that the alignment of the specific metal magnetic powder can be performed more easily.

In order to adjust the viscosity of the resin composition used for forming the magnetic sheet, various solvents can be used. Examples of the solvents include an aromatic hydrocarbon compound such as benzene, toluene, or xylene, methyl ethyl ketone, cyclohexanone, and methyl isobutyl ketone. Further, in order to adjust the shape of the resin composition applied, 5 mass % or lower of a high boiling point solvent such as diacetone alcohol with respect to the total amount of the solvent may be added.

The viscosity of the resin composition may be appropriately adjusted under conditions such as a condition where the resin composition can be applied using a well-known coating device such as a coater or a doctor blade, a condition where the resin composition itself has appropriate fluidity, and a condition where excessive sedimentation of the specific metal magnetic powder can be suppressed.

From the above-described points, the viscosity of the resin composition is preferably 0.5 mPa·s to 500000 mPa·s and more preferably 1 mPa·s to 50000 mPa·s. The viscosity is measured at normal temperature (25° C.).

In a case where the viscosity of the resin composition is in the above-described range, the sedimentation of the specific metal magnetic powder caused by an excessive increase in the amount of the resin component is suppressed, and a decrease in magnetic field effect caused by a decrease in the behavior of the specific metal magnetic powder, for example, in a case where a magnetic field is applied to the power supply member is suppressed.

From the above-described viewpoints, it is preferable that the viscosity of the resin composition is in the above-described appropriate range, for example, by adjusting the viscosity using the solvent and adjusting the content of the specific metal magnetic powder, that is, the solid content concentration of the resin composition.

The viscosity of the resin composition can be measured using the following method.

The viscosity of the resin composition can be measured using a method such as a vibration viscometer, a rotary viscometer, or a capillary viscometer. For example, using a vibration viscometer VM-10A (manufactured by Sekonic Corporation), the viscosity of the resin composition can be measured by putting 10 ml of the resin composition into a glass bottle and dipping a detection terminal in the resin composition under a temperature condition of 25° C.

The resin composition can be prepared by mixing the respective components with the solvent and at least dissolving or dispersing the respective components in the solvent.

The viscosity of the resin composition can be appropriately adjusted by adjusting the content of the specific metal magnetic powder in the resin composition, the kind of the binder resin, the kind of the solvent to be used, the content of the solvent, and the like.

(Formation of Magnetic Sheet)

Hereinafter, an example of a method of forming the magnetic sheet from the resin composition will be described.

The magnetic sheet can be obtained by molding the resin composition in a sheet shape.

In general, by applying the resin composition to the substrate surface, a shear force in a horizontal direction is generated, and the specific metal magnetic powder in the coating film is arranged in a direction parallel to the coating surface.

Specifically, one example of the method of forming the magnetic sheet include: a step of preparing a resin composition solution by dissolving or dispersing the resin composition in a solvent; a step of obtaining a magnetic film in a semi-cured state by applying the resin composition solution to a surface of a release substrate and drying the applied resin composition solution; and a step of obtaining a resin sheet by laminating a plurality of the magnetic films in the semi-cured state and hot pressing the laminate.

First, a resin composition solution having a lower viscosity is prepared by dissolving or dispersing the resin composition in a solvent.

Examples of the solvent include an organic solvent, for example, a ketone such as acetone or methyl ethyl ketone (MEK), an ester such as ethyl acetate, an ether such as propylene glycol monomethyl ether, and an amide such as N,N-dimethylformamide. In addition, other examples of the solvent include water and an aqueous solvent, for example, an alcohol such as methanol, ethanol, propanol, or isopropanol.

The solid content of the specific metal magnetic powder in the resin composition solution is, for example, 10 mass % or higher and preferably 30 mass % or higher and is, for example, 90 mass % or lower and preferably 85 mass % or lower.

Next, the resin composition solution is applied to the surface of the release substrate and dried.

An application method is not particularly limited, and a well-known application method can be used for the application. Examples of the application method include a doctor blade method, a roll coating method, a screen coating method, and a gravure coating method.

As drying conditions of the applied magnetic film, the drying temperature is, for example, 70° C. to 160° C., and the drying time is, for example, 1 minute to 5 minutes.

As the release substrate used for forming the magnetic film, a release substrate obtained by performing a release treatment on a substrate surface not having releasability, a substrate itself that has a surface having releasability, or the like can be used.

Examples of the substrate on which a release treatment is performed include a polyethylene terephthalate (PET) film, a polyethylene film, a polypropylene film, and paper. Examples of the release substrate include a release substrate obtained by performing a release treatment on a surface of the above-described resin substrate or the paper substrate, for example, using a fluorine release agent, a long chain alkyl acrylate release agent, or a silicone release agent.

Examples of the release substrate itself that has a surface having releasability include a plastic film such as a polyimide film, a polyester film, a polyethylene terephthalate film, a polyethylene naphthalate film, or a polycarbonate film, a metal film such as aluminum foil, a resin substrate that is reinforced by a glass substrate, plastic nonwoven fiber, or the like, a silicon substrate, and a glass substrate.

The average thickness of the release substrate can be, for example, 1 μm to 500 μm.

The average thickness of the magnetic film in the semi-cured state that is obtained by applying the resin composition solution to the release substrate is, for example, 5 μm or more and preferably 50 μm or more and is, for example, 500 μm or less and preferably 250 μm or less.

Next, a plurality of the obtained magnetic films are prepared, and the plurality of soft magnetic film are hot-pressed in a thickness direction to form a magnetic sheet having a desired thickness.

The magnetic film in the semi-cured state is heated and cured by hot pressing. In addition, a magnetic sheet including a high content of the specific metal magnetic powder in the magnetic film can be obtained, and the magnetic properties of the magnetic sheet can be further improved.

Hot pressing can be performed using a well-known press machine, and examples of the press machine include a parallel flat plate press machine.

The number of the magnetic films to be laminated is, for example, 2 or more and is, for example, 20 or less and preferably 5 or less. As a result, the laminate can be adjusted to a soft magnetic film having a desired thickness.

The heating temperature during hot pressing is, for example, 80° C. or higher and preferably 100° C. or higher and is, for example, 200° C. or lower and preferably 180° C. or lower.

The heating time is, for example, 0.1 hours or longer and preferably 0.2 hours or longer and is, for example, 24 hours or shorter and preferably 2 hours or shorter.

The pressing pressure is, for example, 10 MPa or higher and preferably 20 MPa or higher and is, for example, 500 MPa or lower and preferably 200 MPa or lower.

A preferable thickness of the obtained magnetic sheet is as described above.

Examples of another method of forming the magnetic sheet include a method of directly applying the above-described resin composition to a desired substrate and heating and drying the applied resin composition.

In a case where a magnetic sheet having a large thickness is formed, a magnetic sheet having a desired thickness can be formed by repeating the application and drying multiple times. It is preferable that the magnetic sheet having the desired thickness is finally heated to be cured.

The substrate is not particularly limited as long as it is in the form of a film and can be used depending on the purpose.

Examples of the substrate include a polyethylene terephthalate film, a polyethylene naphthalate film, a polyimide film, a polyphenylene sulfide film, a polypropylene oxide film, a polyethylene film, a polypropylene film, and a polyamide film.

The thickness of the substrate can be appropriately selected depending on the use configuration of the power supply member and can be, for example, several μm to several hundreds of μm.

A finished product of the final magnetic sheet is provided in the form of a magnetic sheet from which the substrate as the release substrate is peeled off and in the form of a magnetic sheet integrated with the substrate.

In a case where the magnetic sheet is provided in the form of the magnetic sheet from which the substrate is peeled off, it is preferable to use a substrate that is formed of a material having releasability such that the substrate can be easily peeled off or to use a substrate where a release treatment is performed on a surface of the substrate where the magnetic sheet is to be formed.

In addition, examples of the form where the substrate is not peeled off include an aspect where a first magnetic sheet is formed on a desired substrate to form a power supply member.

Examples of another method of forming the magnetic sheet include a well-known film forming method such as a doctor blade method of casting a slurry-like resin composition into an inlet port of a doctor blade to form a film having a uniform thickness and drying the film or a melt extrusion method described in, for example, JP2005-269599A.

For example, the doctor blade method is a method of casting a slurry-like resin composition including the specific metal magnetic powder, the resin, and the organic solvent into an inlet port of a doctor blade and molding the resin composition in a sheet shape having a uniform thickness.

The method of forming the magnetic sheet by applying the resin composition can refer to, for example, "Latest Coating Technique" (May 31, 1983), issued by United Engineering Center.

In addition, by applying the formed magnetic sheet using a calender roll method, a hot press method, or the like, the thickness can be adjusted, and the surface can be made smoother. For example, using a calender roll method, a hot press method, or the like, the thickness of the formed magnetic sheet can be further reduced, or a plurality of thin magnetic films can be laminated and integrated to form one magnetic sheet. As a result, the magnetic body density in the magnetic sheet increases such that an effect of improving the magnetic permeability can be obtained.

[Method of Manufacturing Magnetic Sheet for Coil Arrangement]

A method of manufacturing the magnetic sheet for coil arrangement according to the embodiment of the present disclosure is not particularly limited, and the magnetic sheet for coil arrangement may be manufactured by appropriately applying the above-described method of forming the magnetic sheet, a well-known method of manufacturing a resin sheet, or the like.

In particular, it is preferable that the magnetic sheet for coil arrangement according to the embodiment of the present disclosure having suitable magnetic properties is manufactured using the method of manufacturing the magnetic sheet for coil arrangement according to the embodiment of the present disclosure described below from the viewpoint of further improving productivity and properties of the obtained magnetic sheet for coil arrangement.

The method of manufacturing the magnetic sheet for coil arrangement according to the embodiment of the present disclosure is a method of manufacturing a magnetic sheet for coil arrangement used for a power supply member in a wireless power supply system where power is transmitted and received between a pair of coils distant from each other, the method comprising: a step A of forming a first magnetic sheet including metal magnetic powder arranged in a direction in which a long side is parallel to a surface of the magnetic sheet using a resin composition including metal magnetic powder where a ratio of a length of the long side to a length of a short side is more than 1.0 and a resin; and a step B of forming a second magnetic sheet including metal magnetic powder where a long side is arranged in a direction parallel to a normal direction of the first magnetic sheet using the resin composition including the metal magnetic powder and the resin in a portion that is provided at least either further inside than an inner peripheral end of a coil around which a conductive wire is wound or further outside than an outer peripheral end of the coil in a region that is provided in the first magnetic sheet and where the coil is arranged.

(Step A)

The step A is a step of forming a first magnetic sheet including metal magnetic powder arranged in a direction in which a long side is parallel to a surface of the magnetic sheet using a resin composition including metal magnetic powder where a ratio of a length of the long side to a length of a short side is more than 1.0 and a resin.

The step A can be performed by applying the above-described method of forming the magnetic sheet.

That is, while appropriately adjusting the viscosity and the film forming method, the resin composition including at least the specific metal magnetic powder, the resin, and the organic solvent is applied under the condition where the long side of the specific metal magnetic powder is aligned in the direction parallel to the surface of the obtained magnetic sheet. As a result, the magnetic sheet can be formed.

(Step B)

The step B is a step of forming a second magnetic sheet including metal magnetic powder where a long side is arranged in a direction parallel to a normal direction of the first magnetic sheet using the resin composition including the metal magnetic powder and the resin in a portion that is provided at least either further inside than an inner peripheral end of a coil around which a conductive wire is wound or further outside than an outer peripheral end of the coil in a region that is provided in the first magnetic sheet and where the coil is arranged.

As described above, a well-known method of forming a magnetic sheet can be applied to the method of forming the first magnetic sheet.

On the other hand, the second magnetic sheet is a magnetic sheet including metal magnetic powder where a long side is arranged in a direction parallel to a normal direction of the first magnetic sheet. Therefore, it is necessary to manufacture the magnetic sheet where the specific metal magnetic powder is arranged in the appropriate direction.

Hereinafter, preferable aspects of the step B that is applied to the method of manufacturing the magnetic sheet for coil arrangement according to the embodiment of the present disclosure will be described.

First, the step B according to the first embodiment of the second magnetic sheet will be described with reference to the drawing.

The step B according to the first embodiment of the second magnetic sheet includes a step B1-1 of obtaining a magnetic sheet including metal magnetic powder where a long side is arranged in a direction parallel to a surface using a resin composition including the specific metal magnetic powder and a resin, a step B1-2 of obtaining a cut piece by cutting the obtained magnetic sheet, and a step B1-3 of forming a second magnetic sheet by arranging the cut piece in a direction where a long side of metal magnetic powder in the cut piece is parallel to a normal direction of the first magnetic sheet and fixing the cut piece to a surface of the first magnetic sheet obtained in the step A.

Figure 10:
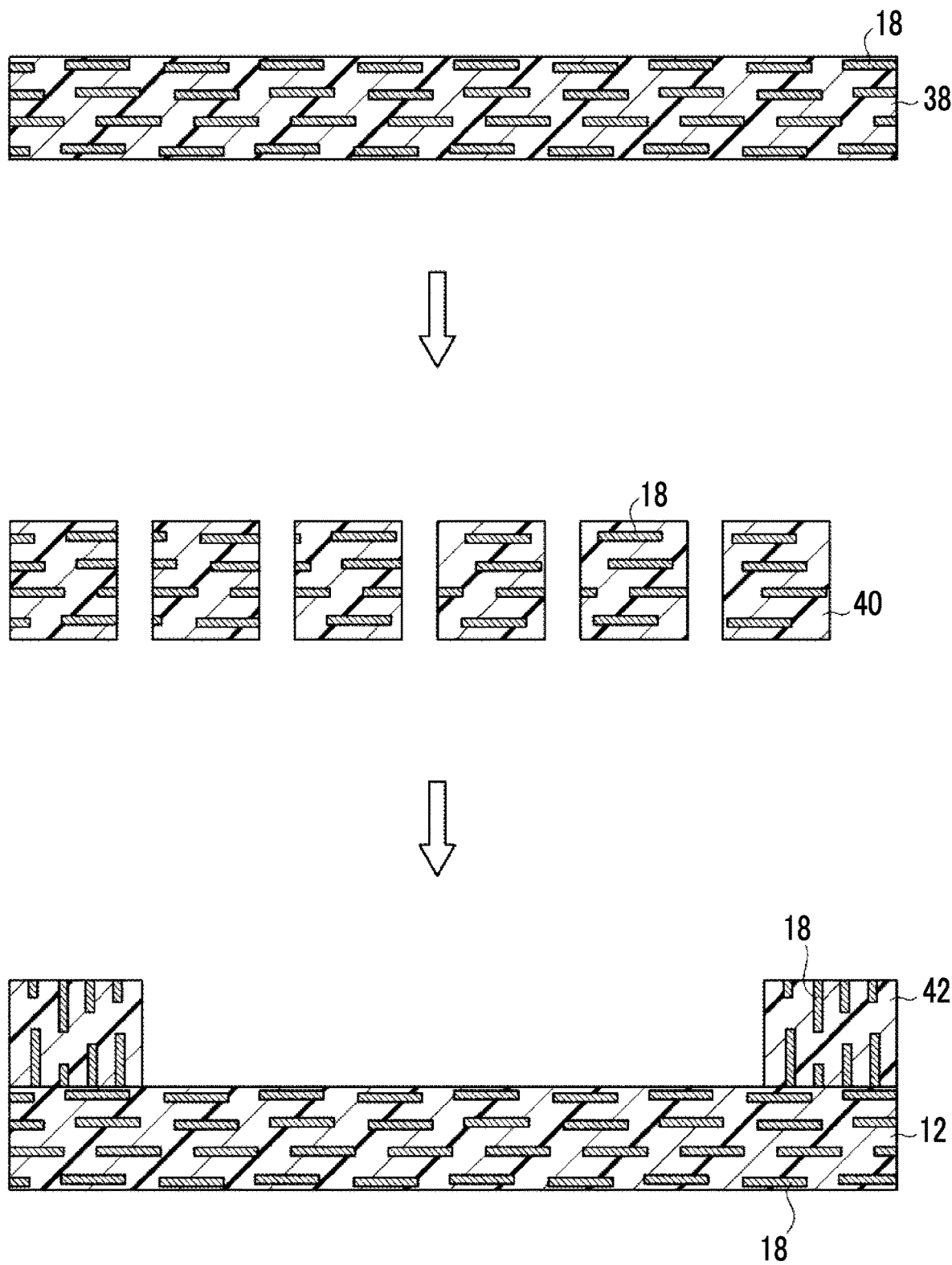
FIG. 10 is a schematic cross-sectional view showing an example of an aspect where the second magnetic sheet is formed by cutting a magnetic sheet where a long side is arranged in a direction parallel to a surface of the magnetic sheet to obtain a cut piece and fixing the cut piece to a surface of a first magnetic sheet in one embodiment of a method of manufacturing a magnetic sheet for coil arrangement according to the present disclosure.

FIG. 10 is a schematic cross-sectional view showing a procedure of the step B according to the first embodiment. First, in the step B1-1, a magnetic sheet 38 including the specific metal magnetic powder 18 arranged in the direction in which the long side is parallel to the surface is obtained (refer to the upper section in FIG. 10). Next, a cut piece 40 is obtained by cutting the magnetic sheet 38 obtained in the step B1-1 in the step B1-2 (refer to the intermediate section of FIG. 10). In the step B1-3, a second magnetic sheet 42 is obtained by arranging the cut piece 40 obtained in the step B1-2 in a direction where a long side of metal magnetic powder in the cut piece is parallel to a normal direction of the first magnetic sheet on a surface of the first magnetic sheet 12 obtained in the step A (refer to the lower section in FIG. 10). In the step B1-3, the cut piece 40 obtained in the step B1-2 is reversed by 90° to obtain the second magnetic sheet 42.

Using this method, the resin sheet including the second magnetic sheet 42 that is arranged on one surface of the first magnetic sheet 12 and where the long side of the metal magnetic powder 18 is arranged in the direction parallel to the normal direction of the first magnetic sheet 12 is obtained.

The step B according to the second embodiment of the second magnetic sheet will be described with reference to the drawing.

The second embodiment of the second magnetic sheet is a resin sheet having a helical structure that is arranged on one surface of the first magnetic sheet and includes metal magnetic powder arranged in the direction in which the long side is parallel to the normal direction of the first magnetic sheet.

The step B according to the second embodiment of the second magnetic sheet includes a step B2-1 of obtaining a magnetic sheet including metal magnetic powder arranged in a direction in which a long side is parallel to a surface using the resin composition including the metal magnetic powder and the resin, a step B2-2 of obtaining a belt-shaped cut piece by cutting the magnetic sheet obtained in the Step B2-1 in a direction in which the long side of the metal magnetic powder in the magnetic sheet is arranged in a direction parallel to the normal direction of the first magnetic sheet, and a step B2-3 of forming a second magnetic sheet by winding the belt-shaped cut piece obtained in the step B2-2 to obtain a resin mass and fixing the resin mass to a surface of the first magnetic sheet obtained in the step A.

Figure 11:
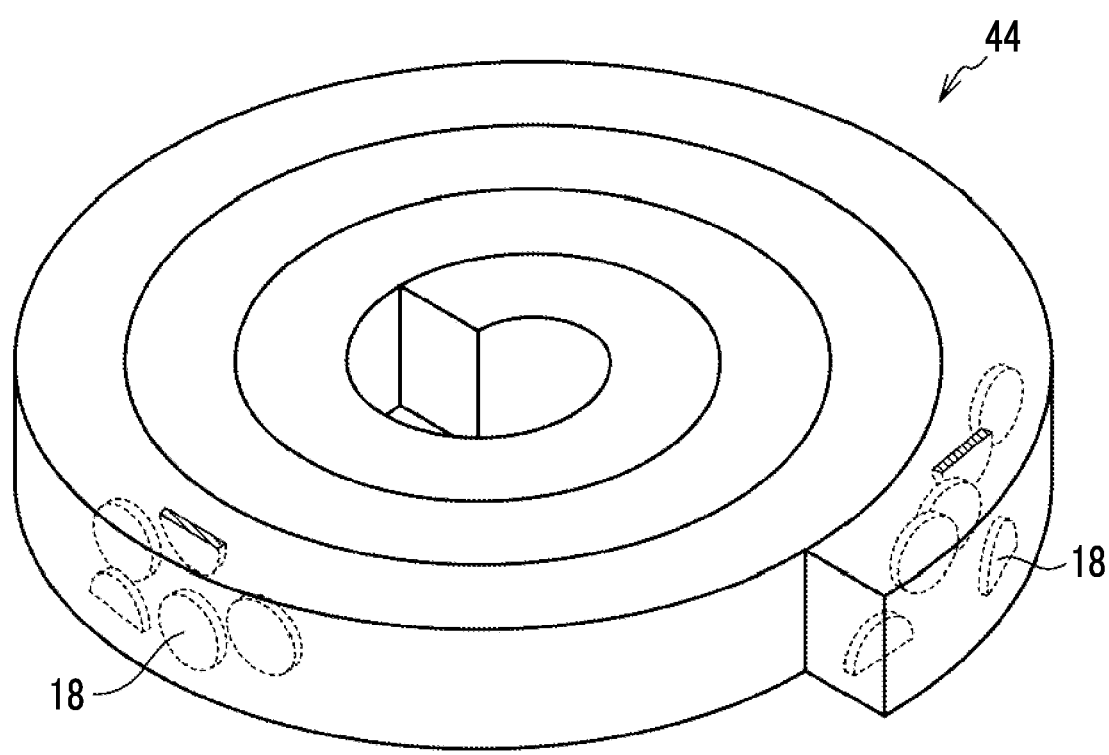
FIG. 11 is a perspective view showing an example of an aspect where the second magnetic sheet is formed by cutting a magnetic sheet where a long side is arranged in a direction parallel to a surface of the magnetic sheet to obtain a belt-shaped cut piece and winding the cut belt-shaped cut piece in one embodiment of a method of manufacturing a magnetic sheet for coil arrangement according to the present disclosure.

FIG. 11 is a perspective view showing a second magnetic sheet 44 having a helical structure that is formed by winding the belt-shaped cut piece obtained in the step B2-2 according to the second embodiment by cutting the magnetic sheet in the direction in which the long side of the specific metal magnetic powder is arranged in a direction parallel to the normal direction of the first magnetic sheet.

As in the second magnetic sheet 44 schematically shown in FIG. 11, the specific metal magnetic powder 18 in the second magnetic sheet is arranged in the direction in which the long side is parallel to the normal direction of the arranged first magnetic sheet (not illustrated).

The step B according to the third embodiment of the second magnetic sheet will be described with reference to the drawing.

The step B according to the third embodiment of the second magnetic sheet includes a step B3-1 of obtaining a magnetic sheet including metal magnetic powder arranged in a direction in which a long side is parallel to a surface using a resin composition including the specific metal magnetic powder and a resin, a step B3-2 of obtaining a belt-shaped cut piece by cutting the magnetic sheet obtained in the Step B3-1 in a direction in which the long side of the metal magnetic powder in the magnetic sheet is arranged in a direction parallel to a plane direction of the first magnetic sheet, and a step B3-3 of forming a second magnetic sheet by folding the belt-shaped cut piece obtained in the step B3-2 in a zigzag manner to form a resin mass and fixing the resin mass to a surface of the first magnetic sheet obtained in the step A.

FIG. 12 is a schematic cross-sectional view showing a resin mass that is obtained by folding, in a zigzag manner, the belt-shaped cut piece 38 obtained in the step B3-1 according to the third embodiment by cutting the magnetic sheet in the direction in which the long side of the specific metal magnetic powder is arranged in a direction parallel to the surface of the first magnetic sheet, that is, showing a second magnetic sheet 46 having a folded structure.

As in the second magnetic sheet 46 schematically shown in FIG. 12, by folding the cut piece 38 in a zigzag manner, most of the specific metal magnetic powder 18 in the second magnetic sheet is arranged in the direction in which the long side is parallel to the normal direction of the arranged first magnetic sheet (not illustrated).

This way, the second magnetic sheet 46 having a folded structure that is arranged on one surface of the first magnetic sheet and includes metal magnetic powder arranged in a direction in which a long side is parallel to a surface of the magnetic sheet is simply formed.

The formed second magnetic sheet 46 having a folded structure is a suitable second magnetic sheet that is formed by being fixed to any region of the surface of the first magnetic sheet obtained in the step A.

The step B according to the fourth embodiment of the second magnetic sheet will be described with reference to the drawing.

The step B according to the fourth embodiment of the second magnetic sheet includes a step B4-1 of forming a second magnetic sheet by bending a pair of side end portions facing each other in the first magnetic sheet that is obtained in the step A and includes the metal magnetic powder arranged in the direction in which the long side is parallel to the surface with respect to a surface of the first magnetic sheet.

The step B according to the fifth embodiment of the second magnetic sheet will be described with reference to the drawing.

Figure 13A:
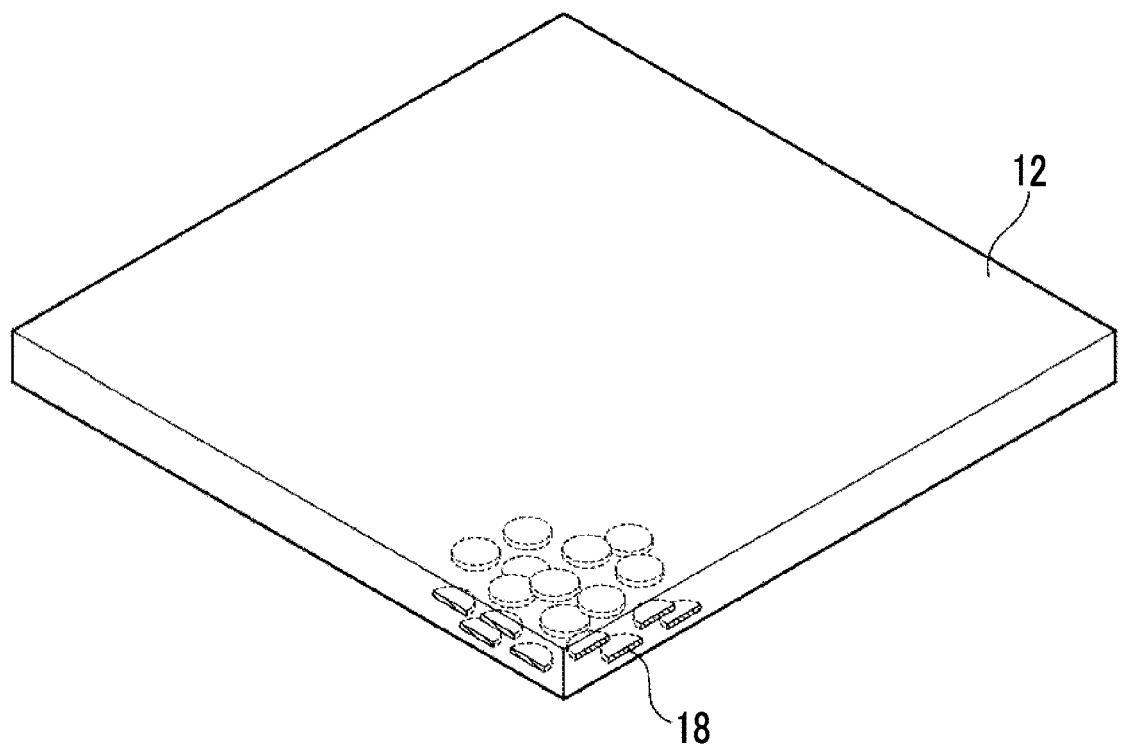
FIG. 13A is a perspective view showing a first magnetic sheet where metal magnetic powder is arranged in a direction in which a long side is parallel to a surface of the magnetic sheet in one embodiment of a method of manufacturing a magnetic sheet for coil arrangement according to the present disclosure, in which an arrangement direction of a part of the metal magnetic powder is schematically shown.

FIG. 13A is a perspective view showing the first magnetic sheet 12 obtained in the step A. The specific metal magnetic powder 18 in the first magnetic sheet 12 is schematically shown in a part of the first magnetic sheet 12. As shown in FIG. 13A, the specific metal magnetic powder 18 is arranged in the direction where a long side is parallel to a plane direction of the first magnetic sheet.

Figure 13B:
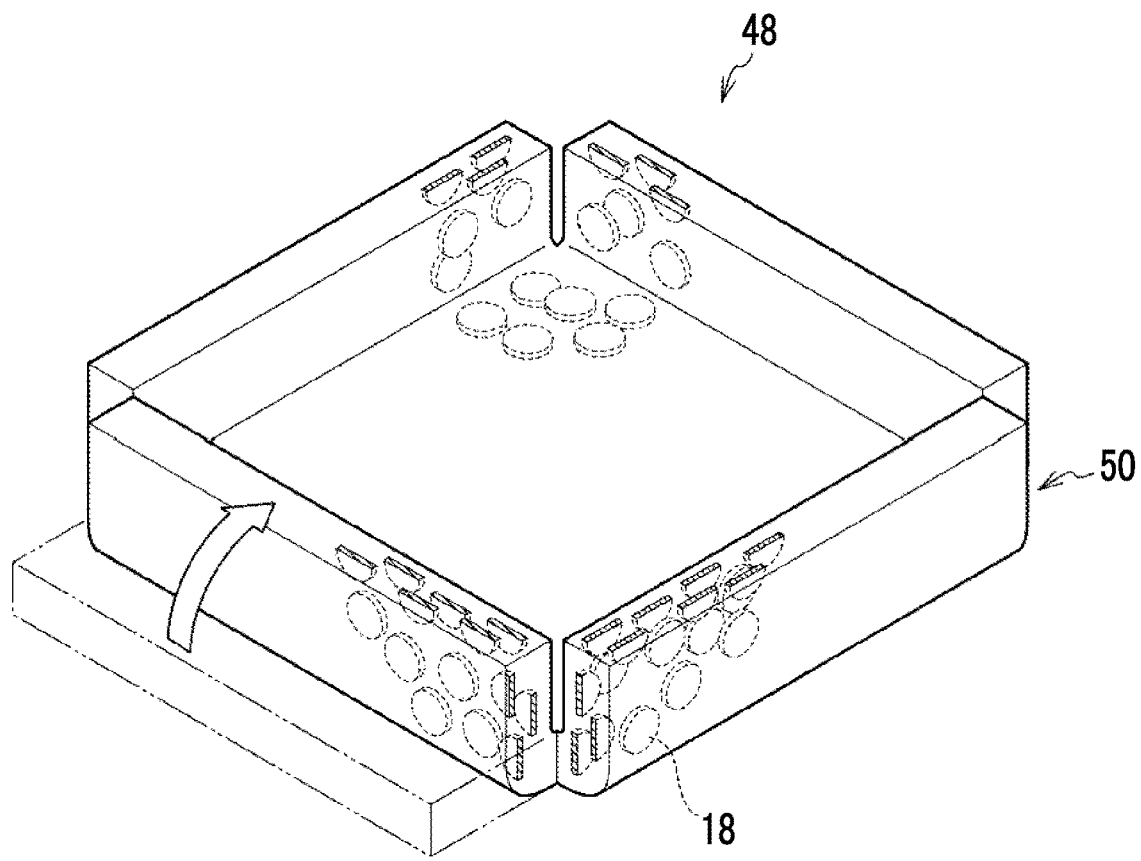
FIG. 13B is a perspective view showing an example of an aspect where the second magnetic sheet is formed that is a bending portion where metal magnetic powder is arranged in a direction in which a long side is parallel to a normal direction of the first magnetic sheet by folding a pair of side end portions of the first magnetic sheet shown in FIG. 13A facing each other, in which an arrangement direction of a part of the metal magnetic powder is schematically shown.

FIG. 13B is a perspective view showing as a magnetic sheet 48 for coil arrangement, an example of an aspect including a bending portions 50 that is formed by bending a pair of side end portions of the first magnetic sheet 12 shown in FIG. 13A facing each other with respect to the surface of the first magnetic sheet, that is, an aspect where the bending portions 50 formed in the step B4-1 form the second magnetic sheet of the magnetic sheet 48 for coil arrangement.

In the fifth embodiment, the bending portions 50 form the second magnetic sheet. In the bending portions 50 as the second magnetic sheet, as schematically shown in FIG. 13B, the specific metal magnetic powder 18 is arranged in the direction parallel to the normal line of the first magnetic sheet 12 and is included in the second magnetic sheet (bending portion) 50.

In the fifth embodiment of the second magnetic sheet, the second magnetic sheet 50 is formed using the simple manufacturing method of forming the first magnetic sheet 12 and bending a pair of side end portions facing each other with respect to the surface of the first magnetic sheet.

The fifth embodiment adopts the aspect where the second magnetic sheet 50 is formed on a side outside of the outer periphery of the arranged coil in the magnetic sheet 48 for coil arrangement.

The step B according to the sixth embodiment of the second magnetic sheet will be described.

The step B according to the sixth embodiment of the second magnetic sheet includes a step B5-1 of forming a magnetic layer on an outer peripheral surface of a cylindrical substrate or a columnar substrate by preparing the cylindrical substrate or the columnar substrate and applying the resin composition including the metal magnetic powder and the resin to the outer peripheral surface of the cylindrical substrate or the columnar substrate under a condition that the metal magnetic powder is arranged in a direction where a long side is parallel to the outer peripheral surface of the cylindrical substrate or the columnar substrate; and a step B5-2 of forming a second magnetic sheet by fixing the cylindrical substrate or the columnar substrate where the magnetic layer is formed to a surface of the first magnetic sheet obtained in the step A.

In the sixth embodiment of the second magnetic sheet, the second magnetic sheet is a resin sheet that is provided in an outer peripheral portion of a cylindrical substrate or a columnar substrate arranged on one surface of the first magnetic sheet obtained in the step A and includes metal magnetic powder arranged in a direction in which a long side is parallel to a surface of the second magnetic sheet.

In the manufacturing method according to the sixth embodiment of the second magnetic sheet, by using the cylindrical or columnar substrate corresponding to the wound shape of the coil, the second magnetic sheet having the desired shape can be easily formed.

In the sixth embodiment of the second magnetic sheet, the second magnetic sheet is present on a side inside of the inner periphery of the arranged coil.

In the method of manufacturing the magnetic sheet for coil arrangement according to the embodiment of the present disclosure, various modification examples of the magnetic sheet for coil arrangement that can impart to a satisfactory Q value used for the wireless power supply member can be manufactured using the simple method, and the application range thereof is wide.

The wireless power supply member of a magnetic resonance method in which the magnetic sheet for coil arrangement according to the embodiment of the present disclosure can realize a satisfactory Q value, and the power supply efficiency is excellent.

EXAMPLES

Hereinafter, the magnetic sheet for coil arrangement according to the embodiment of the present disclosure will be described in more detail using Examples. The present disclosure is not limited to the following Examples within a range not exceeding the scope, and various modification examples can be made.

Example 1

<Preparation of Magnetic Sheet>
—Preparation of Resin Composition—
36.2 g of a Fe—Si—Al flat magnetic body (FME3DH: trade name, manufactured by Sanyo Special Steel Co., Ltd.: specific metal magnetic powder), 8.3 g of nitrile rubber (NBR rubber, N215SL: trade name, manufactured by JSR Corporation: resin), and 57 g of cyclohexanone as a solvent were stirred and mixed at normal temperature (25° C.) to obtain a resin composition including the specific metal magnetic powder and the resin.

The Fe—Si—Al flat magnetic body was flat metal magnetic powder having an unstructured flat shape and having an average diameter (average length) of long sides of 30 μm and a thickness (short side) of 1 μm. Accordingly, the ratio of the long side to the short side was 30.

The obtained resin composition was cast onto a release film and was dried to prepare a magnetic sheet having a thickness of 1.4 mm. The obtained magnetic sheet was cut in a circular shape having a diameter of 75 mm to obtain a first magnetic sheet. (Step A)

In a case where a cross-section of the first magnetic sheet was observed with a SEM, the long side of the specific metal magnetic powder was mainly aligned in a direction parallel to a plane direction of the magnetic sheet.

<Measurement of Magnetic Permeability of Magnetic Sheet>

The obtained magnetic sheet was processed in a toroidal shape, tin-plated copper wire coated with tetrafluoroethylene was wound 25 times, and an inductance L at 100 kHz was measured using a LCR meter (IM3536: trade name, manufactured by Hioki E.E. Corporation) to obtain the magnetic permeability of the magnetic sheet. As a result, the magnetic permeability $\mu'$ was $5.2 \times 10^{-5}$ [H/m].

The LCR meter is a measuring instrument that measures a parameter value of an electronic component such as a coil (L), a capacitor (C), or a resistor (R).

<Preparation of Coil>
20-turn litz wire (conductive wire) having a diameter of 0.08 mm was wound ten times in a circular shape having an inner diameter of 55 mm to prepare a spiral coil.

Coatings at both ends of the litz wire were peeled off with sandpaper, and the peeled positions were soldered to obtain a contacts.

The spiral coil obtained as described above was attached to a surface of the first magnetic sheet obtained in the step A. The spiral coil was attached to the surface of the first magnetic sheet in a state where the spiral coil was not buried in the first magnetic sheet.

<Preparation of Second Magnetic Sheet>
The same magnetic sheet as the first magnetic sheet obtained in the step A was cut into a belt shape having a width of 3.0 mm to obtain a belt-shaped cut piece. The obtained belt-shaped magnetic sheet cut piece was wound in a helical shape as shown in FIG. 11 to obtain a second magnetic sheet having a helical structure having an outer diameter of 54 mm. As shown in FIG. 11, the second magnetic sheet includes specific metal magnetic powder arranged in a direction in which a long side is parallel to a normal direction of the first magnetic sheet.

The obtained second magnetic sheet having a helical structure was fitted and fixed to the center of an inner peripheral portion of the spiral coil attached to the surface of the first magnetic sheet. As a result, a power supply member having the aspect shown in the schematic cross-sectional view of FIG. 2 was obtained, the power supply member including: the coil that was wound around and arranged on one surface of the first magnetic sheet; and the second magnetic sheet that was arranged on the same surface of the first magnetic sheet as the surface where the coil is arranged and was arranged on a side inside of the inner peripheral end of the coil. (Step B)

Comparative Example 1

A power supply member according to Comparative Example 1 was obtained using the same method as that of Example 1, except that the second magnetic sheet arranged on the center of the inner peripheral portion of the spiral coil was not provided.

Comparative Example 2

A power supply member according to Comparative Example 2 was obtained using the same method as that of Example 1, except that a comparative magnetic sheet described below was arranged instead of the second magnetic sheet that was arranged on the side inside of the inner periphery of the spiral coil and included the specific metal magnetic powder arranged in the direction in which the long side was parallel to the normal direction of the first magnetic sheet.

<Comparative Magnetic Sheet>
In Comparative Example 2, a magnetic sheet (first magnetic sheet) that was formed using the same method as the step A of Example 1 except that the thickness was changed to 3 mm was cut in a circular shape having an outer diameter of 54 mm to obtain a comparative magnetic sheet, and the obtained comparative magnetic sheet was used instead of the second magnetic sheet.

In the comparative magnetic sheet used in Comparative Example 2, a long side was arranged and included in a direction parallel to a plane direction of the first magnetic sheet.

Figure 14:
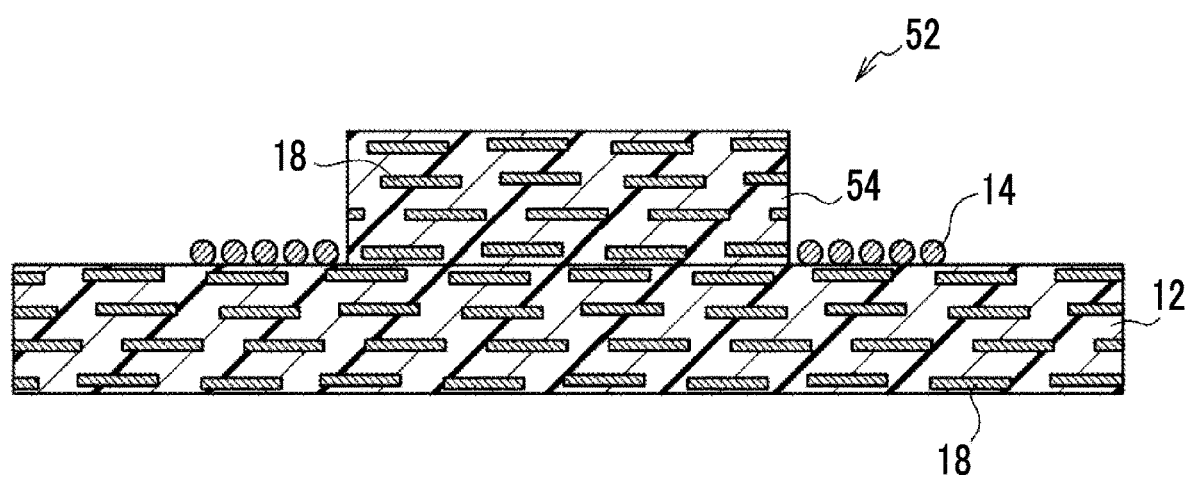
FIG. 14 is a schematic cross-sectional view showing a power supply member according to Comparative Example 2.

The schematic cross-sectional view of the power supply member according to Comparative Example 2 is shown in FIG. 14. As shown in FIG. 14, in a power supply member 52 according to Comparative Example 2, in both of comparative magnetic sheets 54 corresponding to the first magnetic sheet 12 and the second magnetic sheet, the long side of the specific metal magnetic powder was included in the direction parallel to the plane direction of the magnetic sheet 12.

<Evaluation of Power Supply Member>

The obtained power supply members according to Example 1, Comparative Example 1, and Comparative Example 2 were evaluated using the same LCR meter as that used for measuring the magnetic permeability of the magnetic sheet. That is, by connecting both ends of the coil of the power supply member to the LCR meter and applying a current of 100 kHz to the LCR meter, the Q value of the power supply member at 100 kHz was measured.

The results are shown in the following Table 1.

TABLE 1

| | Thickness of First Magnetic Sheet (mm) | Arrangement Position of Second Magnetic Sheet | Q value (100 kHz) | Ratio of Q Value relative to Comparative 1 |
|---|---|---|---|---|
| Example 1 | 1.4 | Side Inside of Coil Inner Periphery | 29.8 | 1.12 |
| Comparative Example 1 | 1.4 | None | 26.6 | — |
| Comparative Example 2 | 1.4 | Side Inside of Coil Inner Periphery (Comparative Magnetic Sheet) | 27.9 | 1.04 |

It can be seen from the results of Table 1 that the power supply member according to Example 1 exhibited a higher Q value than the power supply member according to Comparative Example 1 not including the second magnetic sheet and the power supply member according to Comparative Example 2 where the long side of the specific metal magnetic powder in the comparative magnetic sheet was included in the direction parallel to the plane direction of the first magnetic sheet. In addition, the Q value was 1.12 times with respect to Comparative Example 1 as the reference, and a difference in improvement ratio from 1.04 of Comparative Example 2 was 0.08.

Based on this result, a high power supply efficiency can be expected from the power supply member according to Example 1.

Example 2

<Formation of First Magnetic Sheet>

The resin composition used in Example 1 was cast onto a release film and was dried to prepare a magnetic sheet having a thickness of 2.0 mm This magnetic sheet was processed in a square shape having one side length of 75 mm to form the first magnetic sheet (step A).

In a case where a cross-section of the first magnetic sheet was observed with a SEM, the long side of the specific metal magnetic powder was mainly aligned in a direction parallel to a plane direction of the magnetic sheet.

<Preparation and Attachment of Coil>

An enamel wire (conductive wire) having a diameter of 0.55 mm was wound three times in a rectangular shape to form a coil. The length of one side of the innermost periphery of the coil was 55 mm, and the length of one side of the outermost periphery of the coil was 65 mm.

Coatings at both ends of the enamel wire were peeled off with sandpaper, and the peeled positions were soldered to obtain a contacts.

The rectangularly wound coil obtained as described above was attached to a surface of the first magnetic sheet obtained in the step A.

<Preparation of Second Magnetic Sheet>

The magnetic sheet having a thickness of 2.0 mm obtained in the step A was cut in a belt shape having a width of 2.0 mm and a length of 50 mm to obtain a belt-shaped cut piece. The obtained belt-shaped cut piece was reversed in a direction in which the cut surface was vertically positioned, and was fitted and fixed to positions parallel to four sides of the inner peripheral portion of the coil such that a long side was parallel to the normal direction of the first magnetic sheet. As a result, a power supply member according to Example 2 having the aspect shown in the plan view of FIG. 6A was obtained (Step B). The obtained power supply member includes: the coil 14 that was wound around in a rectangular shape and arranged on one surface of the first magnetic sheet 12; and four second magnetic sheets 30A that were arranged on the same surface of the first magnetic sheet 12 as the surface where the coil is arranged 14 and were arranged on a side inside of the inner peripheral end of the coil 14.

Example 3

A power supply member according to Example 3 having the aspect shown in the plan view of FIG. 7A was obtained using the same method as that of Example 2, except that, using the belt-shaped cut magnetic sheet obtained using the same method as that of Example 2, the second magnetic sheet was formed at each of four sides of the outer periphery of the coil instead of the inner periphery of the coil. The obtained power supply member includes: the coil 14 that was wound around in a rectangular shape and arranged on one surface of the first magnetic sheet 12; and four second magnetic sheets 30B that were arranged on the same surface of the first magnetic sheet 12 as the surface where the coil is arranged 14 and were arranged on a side outside of the outer peripheral end of the coil 14.

Example 4

A power supply member according to Example 4 having the aspect shown in the plan view of FIG. 8A was obtained using the same method as that of Example 2, except that, using the belt-shaped cut magnetic sheet obtained using the same method as that of Example 2, the second magnetic sheet was formed at each of four sides of the outer periphery of the coil in addition to the four sides of the inner periphery of the coil. The obtained power supply member includes: the coil 14 that was wound around in a rectangular shape and arranged on one surface of the first magnetic sheet 12; four second magnetic sheets 30A that were arranged on the same surface of the first magnetic sheet 12 as the surface where the coil is arranged 14 and were arranged on a side inside of the inner peripheral end of the coil 14; and four second magnetic sheets 30B that were arranged on a side outside of the outer peripheral end of the coil 14.

Comparative Example 3

A power supply member according to Comparative Example 3 was obtained using the same method as that of Example 2, except that the second magnetic sheet that was arranged on the side inside of the inner periphery of the coil was not provided.

Comparative Example 4

A power supply member according to Comparative Example 4 was obtained using the same method as that of Example 2, except that the comparative magnetic sheet that had the same shape as that of the second magnetic sheet and included the specific metal magnetic powder arranged in the direction in which the cut surface was parallel to the periphery of the coil (that is, in the direction in which the long side was parallel to the surface of the first magnetic sheet) was arranged at each of four positions inside of the inner periphery of the coil instead of the four second magnetic sheets 30A that included the specific metal magnetic powder arranged in the direction in which the long side was parallel to the normal direction of the first magnetic sheet and were arranged on a side inside of the inner periphery of the coil.

Comparative Example 5

A power supply member according to Comparative Example 5 was obtained using the same method as that of Example 3, except that the comparative magnetic sheet that had the same shape as that of the second magnetic sheet and included the specific metal magnetic powder arranged in the direction in which the cut surface was parallel to the periphery of the coil (that is, in the direction in which the long side was parallel to the surface of the first magnetic sheet) was arranged at each of four positions outside of the outer periphery of the coil instead of the four second magnetic sheets 30B that included the specific metal magnetic powder arranged in the direction in which the long side was parallel to the normal direction of the first magnetic sheet and were arranged on a side outside of the outer periphery of the coil.

Comparative Example 6

A power supply member according to Comparative Example 6 was obtained using the same method as that of Example 4, except that the comparative magnetic sheet that had the same shape as that of the second magnetic sheet and included the specific metal magnetic powder arranged in the direction in which the cut surface was parallel to the periphery of the coil (that is, in the direction in which the long side was parallel to the surface of the first magnetic sheet) was arranged at each of four sides inside of the inner periphery of the coil and each of four sides outside of the outer periphery of the coil instead of the four second magnetic sheets 30A that included the specific metal magnetic powder arranged in the direction in which the long side was parallel to the normal direction of the first magnetic sheet and were arranged on a side inside of the inner periphery of the coil and the four second magnetic sheets 30B that were arranged on a side outside of the outer periphery of the coil.

<Evaluation of Power Supply Member>

Regarding the obtained power supply members according to Examples 2 to 4 and Comparative Examples 2 to 6, the Q value at 100 kHz was measured using the same method as that of Example 1.

The results are shown in Table 2 below.

TABLE 2

| | Second Magnetic Sheet | | | |
|---|---|---|---|---|
| | Position | Arrangement Position of Specific Metal Magnetic Powder | Q value (100 kHz) | Ratio of Q Value relative to Comparative 1 |
| Example 2 | Side Inside of Coil Inner Periphery | Normal Direction of First Magnetic Sheet | 18.5 | 1.09 |
| Comparative Example 3 | None | None | 16.9 | — |
| Comparative Example 4 | Side Inside of Coil Inner Periphery | Plane Direction of First Magnetic Sheet | 17.7 | 1.05 |
| Example 3 | Side Outside of Coil Outer Periphery | Normal Direction of First Magnetic Sheet | 18.4 | 1.09 |
| Comparative Example 5 | Side Outside of Coil Outer Periphery | Plane Direction of First Magnetic Sheet | 17.6 | 1.04 |
| Example 4 | Side Inside of Coil Inner Periphery Side Outside of Coil Outer Periphery | Normal Direction of First Magnetic Sheet | 19.7 | 1.17 |
| Comparative Example 6 | Side Inside of Coil Inner Periphery Side Outside of Coil Outer Periphery | Plane Direction of First Magnetic Sheet | 17.9 | 1.06 |

It can be seen from the results of Table 2 that, in a case where the magnetic sheets corresponding to the second magnetic sheet at the same position were compared to each other, the power supply member according to Example 2 exhibited a higher Q value than the power supply member according to Comparative Example 3 not including the second magnetic sheet and the power supply member according to Comparative Example 4 where the long side of the specific metal magnetic powder in the comparative magnetic sheet was included in the direction parallel to the plane direction of the first magnetic sheet. Likewise, the power supply member according to Example 3 exhibited a higher Q value than the power supply member according to Comparative Example 5, and the power supply member according to Example 4 exhibited a higher Q value than the power supply member according to Comparative Example 6.

In addition, the improvement of the Q value relative to Comparative Example 3 as a reference value was particularly higher in Example 5 including the second magnetic sheets on both of the side inside of the inner periphery of the coil and the side outside of the outer periphery of the coil.

Based on the above-described result, a higher power supply efficiency can be expected from each of the power supply members according to Examples than the power supply members according to Comparative Examples.

Example 5

<Formation of First Magnetic Sheet>

The resin composition used in Example 1 was cast onto a release film and was dried to prepare a magnetic sheet having a thickness of 2.8 mm ($2.8 \times 10^{-3}$ m).

The obtained magnetic sheet was processed in a circular shape having a diameter of 75 mm to form the first magnetic sheet (step A).

In a case where a cross-section of the first magnetic sheet was observed with a SEM, the long side of the specific metal magnetic powder was mainly aligned in a direction parallel to a plane direction of the magnetic sheet.

<Preparation and Attachment of Coil>

20-turn litz wire (conductive wire) having a diameter of 0.08 mm was wound ten times having an inner diameter of 55 mm to prepare a spiral coil.

Coatings at both ends of the litz wire were peeled off with sandpaper, and the peeled positions were soldered to obtain a contacts.

The rectangularly wound coil obtained as described above was attached to a surface of the first magnetic sheet obtained in the step A.

<Preparation of Second Magnetic Sheet>

The magnetic sheet having a thickness of 2.8 mm obtained in the step A was cut in a belt shape having a width of 3.0 mm to obtain a belt-shaped cut piece. The obtained belt-shaped magnetic sheet was wound in a helical shape as shown in FIG. 11 to obtain a second magnetic sheet having a helical structure having an outer diameter of 54 mm. As shown in FIG. 11, the second magnetic sheet having a helical structure includes specific metal magnetic powder arranged in a direction in which a long side is parallel to a normal direction of the first magnetic sheet.

The obtained second magnetic sheet having a helical structure was fitted and fixed to the center of an inner peripheral portion of the spiral coil attached to the surface of the first magnetic sheet. As a result, a power supply member having the aspect shown in the schematic cross-sectional view of FIG. 2 was obtained, the power supply member including: the coil that was wound around and arranged on one surface of the first magnetic sheet; and the second magnetic sheet that was arranged on the same surface of the first magnetic sheet as the surface where the coil is arranged and was arranged on a side inside of the inner peripheral end of the coil (Step B).

<Evaluation of Power Supply Member>

By arranging the obtained power supply member at the center of an aluminum plate having a length of 200 mm, a width of 200 mm, and a thickness of 0.3 m, connecting both ends of the coil of the power supply member to the same LCR meter as that used for the evaluation in Example 1, and applying a current to the LCR meter, the Q value of the power supply member at 100 kHz was measured. As a result, the Q value was 28.7.

Example 6

A power supply member according to Example 6 was obtained using the same method as that of Example 5, except that the thickness of the first magnetic sheet was changed from 2.8 mm to 3.5 mm The Q value of the power supply member according to Example 6 measured using the same method as that of Example 5 was 29.1.

Example 7

A power supply member according to Example 7 was obtained using the same method as that of Example 5, except that the thickness of the first magnetic sheet was changed from 2.8 mm to 2.1 mm The Q value of the power supply member according to Example 7 measured using the same method as that of Example 5 was 27.5.

Example 8

A power supply member according to Example 8 was obtained using the same method as that of Example 5, except that the thickness of the first magnetic sheet was changed from 2.8 mm to 1.4 mm The Q value of the power supply member according to Example 8 measured using the same method as that of Example 5 was 25.4.

Based on the result measured in Example 1, the magnetic permeability of the first magnetic sheet used in each of Examples 5 to 8 was $5.2 \times 10^{-5}$ [H/m]. Here, the value of the product ($\mu' \times t$) of the magnetic permeability $\mu'$ [H/m] and the thickness t [m] of the first magnetic sheet were shown together in Table 3 below.

TABLE 3

| | Thickness of First Magnetic Sheet [mm] | Q Value (100 kHz) | Magnetic Permeability of First Magnetic Sheet [H/m] | $\mu' \times t$ [H] |
|---|---|---|---|---|
| Example 5 | 2.8 | 28.7 | $5.2 \times 10^{-5}$ | $1.4 \times 10^{-7}$ |
| Example 6 | 3.5 | 29.1 | $5.2 \times 10^{-5}$ | $1.8 \times 10^{-7}$ |
| Example 7 | 2.1 | 27.5 | $5.2 \times 10^{-5}$ | $1.1 \times 10^{-7}$ |
| Example 8 | 1.4 | 25.4 | $5.2 \times 10^{-5}$ | $0.72 \times 10^{-7}$ |

It can be seen from the results of Table 3 that all the power supply members according to Examples 5 to 8 exhibited a high Q value even in a case where the thickness of the first magnetic sheet changed.

It can be seen from the calculation result of $\mu' \times t$ that the power supply members according to Examples 5 and 6 satisfying a condition of the following Expression 1 exhibited a higher Q value than the power supply members according to Examples 7 and 8.

$$\mu'[H/m] \times t[m] \geq 1.2 \times 10^{-7}[H] \qquad \text{(Expression 1)}$$

It can be verified from the evaluation results of Examples and Comparative Examples that, in the power supply member according to Example, a more satisfactory Q value than that of the power supply member according to Comparative Example is realized, and a high power supply efficiency can be expected.

In addition, from the viewpoints of the thickness and the magnetic permeability of the first magnetic sheet, it can be seen that a higher Q value can be achieved by satisfying Expression 1.

Example 9

A resin composition was obtained using the same method as that of Example 1, except that the content of the Fe—Si—Al flat magnetic body (FME3DH: trade name, manufactured by Sanyo Special Steel Co., Ltd.: specific metal magnetic powder) in the resin composition was changed from 36.2 g to 65.0 g.

A magnetic sheet having a thickness of 0.9 mm was prepared using the same method as that of Example 5, except that the resin composition obtained as described above was used instead of the same resin composition as that of Example 1. The magnetic permeability of the magnetic sheet was $1.6\times10^{-4}$ [H/m].

A power supply member according to Example 9 was obtained using the same method as that of Example 5, except that a first magnetic sheet was formed using the obtained magnetic sheet with the same method as that of Example 5 and the obtained first magnetic sheet was used. The obtained power supply member was evaluated using the same method as that of Example 5. The results are shown in Table 4 below.

[Example 10] to [Example 12]

Power supply members were obtained using the same method as that of Example 9, except that the thickness of the first magnetic sheet obtained in Example 9 was changed to a value shown in Table 4 below, and the obtained power supply members were evaluated using the same method as that of Example 5. The results are shown in Table 4 below.

TABLE 4

| | Thickness of First Magnetic Sheet [mm] | Q Value (100 kHz) | Magnetic Permeability of First Magnetic Sheet [H/m] | µ' × t [H] |
|---|---|---|---|---|
| Example 9 | 0.9 | 29.1 | $1.6 \times 10^{-4}$ | $1.5 \times 10^{-7}$ |
| Example 10 | 0.8 | 28.8 | $1.6 \times 10^{-4}$ | $1.3 \times 10^{-7}$ |
| Example 11 | 0.7 | 27.2 | $1.6 \times 10^{-4}$ | $1.1 \times 10^{-7}$ |
| Example 12 | 0.6 | 24.6 | $1.6 \times 10^{-4}$ | $0.98 \times 10^{-7}$ |

It can be seen from the results of Table 4 that all the power supply members according to Examples 9 to 12 exhibited a high Q value even in a case where the thickness of the first magnetic sheet changed.

It can be seen from the calculation result of µ'×t that the power supply members according to Examples 9 and 10 satisfying the condition of the Expression 1 exhibited a higher Q value than the power supply members according to Examples 11 and 12.

It can be seen from the evaluation results of Examples and Comparative Examples that the power supply member including the spiral coil formed of a litz wire exhibited a higher Q value than the power supply member including the coil that is formed by winding an enamel wire in a rectangular shape.

EXPLANATION OF REFERENCES

10, 22, 24, 26, 28: power supply member
12: first magnetic sheet (back surface magnetic sheet)
14: coil
16A, 16B, 16C: second magnetic sheet
18: metal magnetic powder
20: magnetic field
30A, 30B, 30C: second magnetic sheet
32, 34, 36: power supply member
38: magnetic sheet
40: cut piece (cut piece of magnetic sheet)
42: second magnetic sheet
44: magnetic sheet having a helical structure (second magnetic sheet)
46: magnetic sheet having a folded structure (second magnetic sheet)
48: magnetic sheet for coil arrangement
50: bending portion (second magnetic sheet)
52: comparative power supply member
54: comparative magnetic sheet The disclosure of Japanese Patent Application No. 2019-036984 filed on Feb. 28, 2019 is incorporated herein in its entirety.

All publications, patent applications, and technical standards mentioned in the present disclosure are herein incorporated by reference to the same extent as if each individual publication, patent application, or technical standard was specifically and individually indicated to be incorporated by reference.

What is claimed is:

1. A power supply member in a wireless power supply system wherein power is transmitted and received between a pair of coils distant from each other, the power supply member comprising:
   a first magnetic sheet comprising a first metal magnetic powder and a first resin, the first metal magnetic powder having a ratio of a length of a long side to a length of a short side of more than 1.0;
   a coil that is wound around and arranged on one surface of the first magnetic sheet; and
   a second magnetic sheet that is arranged on a same surface of the first magnetic sheet as the surface on which the coil is arranged, is arranged on at least one of a side inside of an inner peripheral end of the coil or a side outside of an outer peripheral end of the coil, and comprises a second metal magnetic powder and a second resin, the second metal magnetic powder having a ratio of a length of a long side to a length of a short side of more than 1.0,
   wherein the first metal magnetic powder in the first magnetic sheet is arranged in a direction in which the long side is parallel to a surface of the first magnetic sheet, and
   the second metal magnetic powder in the second magnetic sheet is arranged in a direction in which the long side is parallel to a normal direction of the first magnetic sheet.

2. The power supply member according to claim 1, wherein each of the first metal magnetic powder and the second metal magnetic powder is flat metal magnetic powder.

3. The power supply member according to claim 1, wherein a height of the second magnetic sheet from the surface of the first magnetic sheet is higher than a distance from the surface of the first magnetic sheet on which the coil is arranged to a top of the coil.

4. The power supply member according to claim 1, wherein the second magnetic sheet is a resin sheet that is arranged on the same surface of the first magnetic sheet as the surface on which the coil is arranged and wherein the long side of the second metal magnetic powder is arranged in the direction parallel to the normal direction of the first magnetic sheet.

5. The power supply member according to claim 1, wherein the second magnetic sheet is a resin sheet having a helical structure, that is arranged on the same surface of the first magnetic sheet as the surface on which the coil is arranged and comprises the second metal magnetic powder arranged in the direction in which the long side is parallel to the normal direction of the first magnetic sheet.

6. The power supply member according to claim 1,
wherein the second magnetic sheet is a resin sheet having a folded structure that is arranged on the same surface of the first magnetic sheet as the surface on which the coil is arranged and comprises the second metal magnetic powder arranged in a direction in which a long side is parallel to a surface of the resin sheet.

7. The power supply member according to claim 1,
wherein the second magnetic sheet is formed of bending portions of a pair of side end portions of the first magnetic sheet facing each other.

8. The power supply member according to claim 1,
wherein the second magnetic sheet is a resin sheet that is provided in an outer peripheral portion of a cylindrical substrate or a columnar substrate arranged on the same surface of the first magnetic sheet as the surface on which the coil is arranged and comprises the second metal magnetic powder arranged in a direction in which a long side is parallel to a surface of the cylindrical substrate or the columnar substrate.

9. A magnetic sheet for coil arrangement of a power supply member used in a wireless power supply system wherein power is transmitted and received between a pair of coils distant from each other, the magnetic sheet comprising:
a first magnetic sheet comprising a first metal magnetic powder and a first resin, the first metal magnetic powder having a ratio of a length of a long side to a length of a short side of more than 1.0;
a region that is formed on one surface of the first magnetic sheet and wherein a coil for forming a magnetic field is arranged;
a second magnetic sheet that is arranged on at least one of a side inside of an inner peripheral end of the coil or a side outside of an outer peripheral end of the coil in the region of the first magnetic sheet wherein the coil is arranged and comprises a second metal magnetic powder and a second resin, the second metal magnetic powder having a ratio of a length of a long side to a length of a short side of more than 1.0,
the first metal magnetic powder in the first magnetic sheet is arranged in a direction in which the long side is parallel to a surface of the first magnetic sheet, and
the second metal magnetic powder in the second magnetic sheet is arranged in a direction in which a long side is parallel to a normal direction of the first magnetic sheet.

10. The magnetic sheet for coil arrangement according to claim 9,
wherein a magnetic permeability $\mu'$ of the first magnetic sheet in units of H/m and a thickness t of the first magnetic sheet in units of m satisfy a relationship of the following Expression 1, $$\mu' \times t \geq 1.2 \times 10^{-7} \qquad \text{(Expression 1).}$$

11. The magnetic sheet for coil arrangement according to claim 9,
wherein each of the first metal magnetic powder and the second metal magnetic powder is a flat metal magnetic powder.

12. A method of manufacturing a magnetic sheet for coil arrangement used for a power supply member in a wireless power supply system wherein power is transmitted and received between a pair of coils distant from each other, the method comprising:
(A) forming a first magnetic sheet comprising a first metal magnetic powder arranged in a direction in which a long side is parallel to a surface of the first magnetic sheet, by using a resin composition comprising a first metal magnetic powder and a first resin, the first metal magnetic powder having a ratio of a length of the long side to a length of a short side of more than 1.0; and
(B) forming a second magnetic sheet comprising a second metal magnetic powder arranged in a direction in which the long side is parallel to a normal direction of the first magnetic sheet, by using a resin composition comprising a second metal magnetic powder and a second resin on at least one of a side inside of an inner peripheral end of a coil around which a conductive wire is wound or a side outside of an outer peripheral end of the coil in a region that is provided in the first magnetic sheet and where the coil is arranged, the second metal magnetic powder having a ratio of a length of the long side to a length of a short side of more than 1.0.

13. The method of manufacturing a magnetic sheet for coil arrangement according to claim 12,
wherein each of the first metal magnetic powder and the second metal magnetic powder is a flat metal magnetic powder.

14. The method of manufacturing a magnetic sheet for coil arrangement according to claim 12,
wherein (B) comprises:
(B1-1) obtaining a magnetic sheet comprising the second metal magnetic powder arranged in a direction in which a long side is parallel to a surface using the resin composition comprising the second metal magnetic powder and the second resin,
(B1-2) obtaining a cut piece by cutting the magnetic sheet obtained in (B1-1), and
(B1-3) forming a second magnetic sheet by arranging the cut piece in a direction in which a long side of the second metal magnetic powder in the cut piece is parallel to the normal direction of the first magnetic sheet and fixing the cut piece to a surface of the first magnetic sheet obtained in (A).

15. The method of manufacturing a magnetic sheet for coil arrangement according to claim 12,
wherein (B) comprises:
(B2-1) obtaining a magnetic sheet comprising the second metal magnetic powder arranged in a direction in which a long side is parallel to a surface using the resin composition including the second metal magnetic powder and the second resin,
(B2-2) obtaining a belt-shaped cut piece by cutting the magnetic sheet obtained in (B2-1) in a direction in which the long side of the second metal magnetic powder in the magnetic sheet is arranged in a direction parallel to the normal direction of the first magnetic sheet, and
(B2-3) forming a second magnetic sheet by winding the belt-shaped cut piece obtained in (B2-2) to obtain a resin mass and fixing the resin mass to a surface of the first magnetic sheet obtained in (A).

16. The method of manufacturing a magnetic sheet for coil arrangement according to claim 12,
wherein (B) comprises:
(B3-1) obtaining a magnetic sheet including the second metal magnetic powder arranged in a direction in which a long side is parallel to a surface using the resin composition comprising the second metal magnetic powder and the second resin,
(B3-2) obtaining a belt-shaped cut piece by cutting the magnetic sheet obtained in (B3-1) in a direction in which the long side of the second metal magnetic powder in the magnetic sheet is arranged in a direction parallel to a plane direction of the first magnetic sheet, and
(B3-3) forming a second magnetic sheet by folding the belt-shaped cut piece obtained in (B3-2) in a zigzag manner to form a resin mass and fixing the resin mass to a surface of the first magnetic sheet obtained in (A).

17. The method of manufacturing a magnetic sheet for coil arrangement according to claim 12,
wherein (B) comprises: (B4-1) forming a second magnetic sheet by bending a pair of side end portions facing each other in the first magnetic sheet that is obtained in (A) and comprises the first metal magnetic powder arranged in the direction in which the long side is parallel to the surface with respect to a surface of the first magnetic sheet.

18. The method of manufacturing a magnetic sheet for coil arrangement according to claim 12,
wherein (B) comprises:
(B5-1) forming a magnetic layer on an outer peripheral surface of a cylindrical substrate or a columnar substrate by preparing the cylindrical substrate or the columnar substrate and applying the resin composition comprising the metal magnetic powder and the resin to the outer peripheral surface of the cylindrical substrate or the columnar substrate under a condition that the second metal magnetic powder is arranged in a direction where a long side is parallel to the outer peripheral surface of the cylindrical substrate or the columnar substrate; and
(B5-2) forming a second magnetic sheet by fixing the cylindrical substrate or the columnar substrate where the magnetic layer is formed to a surface of the first magnetic sheet obtained in (A).

\* \* \* \* \*